(12) United States Patent
Dai et al.

(10) Patent No.: US 10,007,094 B1
(45) Date of Patent: Jun. 26, 2018

(54) IMAGE PICKUP OPTICAL LENS SYSTEM

(71) Applicant: Zhejiang Sunny Optics Co., Ltd., Ningbo, Zhejiang (CN)

(72) Inventors: Fujian Dai, Ningbo (CN); Lin Huang, Ningbo (CN); Jianke Wenren, Ningbo (CN)

(73) Assignee: Zhejiang Sunny Optics Co., Ltd., Ningbo, Zhejiang (CN)

( * ) Notice: Subject to any disclaimer, the term of this patent is extended or adjusted under 35 U.S.C. 154(b) by 54 days.

(21) Appl. No.: 15/375,145

(22) Filed: Dec. 11, 2016

(51) Int. Cl.
  *G02B 3/06* (2006.01)
  *G02B 13/18* (2006.01)
  *G02B 3/02* (2006.01)
  *G02B 13/00* (2006.01)
  *G02B 9/60* (2006.01)

(52) U.S. Cl.
  CPC ............ *G02B 13/0045* (2013.01); *G02B 9/60* (2013.01)

(58) Field of Classification Search
  CPC ...... G02B 13/0045; G02B 9/60; G02B 13/18; G02B 3/04; G02B 27/0025; G02B 13/04; G02B 13/002; G02B 1/041
  USPC ......................................... 359/714, 763, 713
  See application file for complete search history.

(56) References Cited

U.S. PATENT DOCUMENTS

| | | | |
|---|---|---|---|
| 2012/0314302 A1* | 12/2012 | Tang ................... | G02B 13/0045 359/714 |
| 2013/0010374 A1* | 1/2013 | Hsieh ..................... | G02B 13/18 359/714 |
| 2016/0282586 A1* | 9/2016 | Hsu ..................... | G02B 13/0045 |

* cited by examiner

*Primary Examiner* — William R Alexander
*Assistant Examiner* — Tamara Y Washington
(74) *Attorney, Agent, or Firm* — Raymond Y. Chan; David and Raymond Patent Firm

(57) ABSTRACT

An optical lens system for forming a subject image on a photoelectric conversion section of a solid image pickup element and an image pickup lens includes, in order from an object side to an image side, a first lens, a second lens, a third lens, a fourth lens, and a fifth lens. The first lens has a positive focal power with a convex surface on an object side thereof and a concave surface on an image side thereof. The second lens has a negative focal power. The third lens has a negative focal power. The fourth lens has a positive focal power with a concave surface on an object side thereof and a convex surface on an image side thereof. The fifth lens has a negative focal power with a concave surface on an image side thereof.

19 Claims, 33 Drawing Sheets

A

TABLE 1

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.2438 | | |
| S1 | Asphere | 1.2204 | 0.4485 | 1.544,56.11 | -2.0440 |
| S2 | Asphere | 5.8740 | 0.0614 | | -0.6687 |
| S3 | Asphere | 9.6792 | 0.2000 | 1.640,23.53 | -17.7606 |
| S4 | Asphere | 2.7277 | 0.3739 | | -83.3841 |
| S5 | Asphere | -21.4556 | 0.2413 | 1.640,23.53 | 99.0000 |
| S6 | Asphere | -46.3811 | 0.4213 | | 99.0000 |
| S7 | Asphere | -5.9788 | 0.5321 | 1.544,56.11 | 0.6400 |
| S8 | Asphere | -1.2133 | 0.5147 | | -3.4635 |
| S9 | Asphere | -6.4344 | 0.2642 | 1.534,55.77 | -29.7743 |
| S10 | Asphere | 1.4638 | 0.4043 | | -9.1116 |
| S11 | Plano | Inf | 0.2100 | 1.517,64.17 | |
| S12 | Plano | Inf | 0.3281 | | |
| IMA | Plano | Inf | | | |

FIG.45

TABLE 2

| Surface # | A4 | A6 | A8 | A10 | A12 | A14 | A16 |
|---|---|---|---|---|---|---|---|
| S1 | 1.4498E-01 | 1.3276E-01 | -8.6500E-01 | 3.8881E+00 | -9.8633E+00 | 1.3411E+01 | -7.6656E+00 |
| S2 | -1.8648E-01 | 1.6310E-01 | 1.6319E+00 | -9.5123E+00 | 2.5729E+01 | -3.6108E+01 | 1.9375E+01 |
| S3 | -2.6072E-01 | 5.6989E-01 | 1.3745E+00 | -1.0951E+01 | 3.1288E+01 | -4.5240E+01 | 2.5487E+01 |
| S4 | 4.1630E-01 | -1.6068E+00 | 8.6552E+00 | -2.7422E+01 | 5.3821E+01 | -5.8601E+01 | 2.7403E+01 |
| S5 | -3.0970E-01 | 2.1667E-01 | -1.2368E+00 | 4.3591E+00 | -8.6401E+00 | 1.0009E+01 | -4.7904E+00 |
| S6 | -2.3869E-01 | 1.2870E-01 | -5.1607E-01 | 1.3798E+00 | -2.0393E+00 | 1.8354E+00 | -6.7477E-01 |
| S7 | -3.4587E-04 | 3.9432E-02 | -7.6611E-02 | 6.8498E-02 | -3.2746E-02 | 8.0396E-03 | -7.9599E-04 |
| S8 | -2.3099E-02 | 4.9130E-03 | 9.9937E-02 | -9.5678E-02 | 3.8403E-02 | -7.4745E-03 | 5.7599E-04 |
| S9 | -2.1209E-01 | 1.5474E-01 | -6.2810E-02 | 1.7231E-02 | -3.0642E-03 | 3.1258E-04 | -1.3769E-05 |
| S10 | -1.2960E-01 | 7.8596E-02 | -3.5065E-02 | 1.0292E-02 | -1.9134E-03 | 2.0075E-04 | -8.8371E-06 |

FIG.46

TABLE 3

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.2517 | | |
| S1 | Asphere | 1.2648 | 0.4687 | 1.544,56.11 | -2.1666 |
| S2 | Asphere | 7.2611 | 0.0660 | | 14.3940 |
| S3 | Asphere | 14.4061 | 0.2000 | 1.640,23.53 | 82.9070 |
| S4 | Asphere | 2.9766 | 0.4390 | | -94.3820 |
| S5 | Asphere | -9.3712 | 0.2272 | 1.640,23.53 | 99.0000 |
| S6 | Asphere | -17.8885 | 0.4180 | | 99.0000 |
| S7 | Asphere | -11.0465 | 0.6505 | 1.544,56.11 | 4.4899 |
| S8 | Asphere | -1.3016 | 0.5169 | | -3.7404 |
| S9 | Asphere | -5.0114 | 0.2642 | 1.534,55.77 | -29.4152 |
| S10 | Asphere | 1.5380 | 0.4078 | | -9.6902 |
| S11 | Plano | Inf | 0.2100 | 1.517,64.17 | |
| S12 | Plano | Inf | 0.3316 | | |
| IMA | Plano | Inf | | | |

FIG.47

TABLE 4

| Surface # | A4 | A6 | A8 | A10 | A12 | A14 | A16 |
|---|---|---|---|---|---|---|---|
| S1 | 1.3997E-01 | 1.0566E-01 | -7.2353E-01 | 3.1347E+00 | -7.5038E+00 | 9.4413E+00 | -4.9552E+00 |
| S2 | -1.6064E-01 | 1.4464E-01 | 9.0562E-01 | -4.7803E+00 | 1.0920E+01 | -1.2697E+01 | 5.3590E+00 |
| S3 | -2.2298E-01 | 4.6609E-01 | 9.4244E-01 | -6.9539E+00 | 1.7536E+01 | -2.1714E+01 | 1.0268E+01 |
| S4 | 3.7134E-01 | -1.3581E+00 | 6.9375E+00 | -2.0774E+01 | 3.8252E+01 | -3.8267E+01 | 1.6170E+01 |
| S5 | -3.2918E-01 | 1.2690E-01 | -6.5254E-01 | 2.4136E+00 | -5.0806E+00 | 6.3440E+00 | -2.9827E+00 |
| S6 | -2.8343E-01 | 1.2297E-01 | -4.3260E-01 | 1.2586E+00 | -1.9948E+00 | 1.8360E+00 | -6.6057E-01 |
| S7 | 4.6627E-03 | -4.4142E-02 | 6.8916E-02 | -5.0672E-02 | 2.1599E-02 | -5.1715E-03 | 5.2148E-04 |
| S8 | 4.2669E-03 | -6.8592E-02 | 1.7084E-01 | -1.3963E-01 | 5.6703E-02 | -1.1683E-02 | 9.6891E-04 |
| S9 | -1.9602E-01 | 1.5125E-01 | -6.9742E-02 | 2.1452E-02 | -4.0787E-03 | 4.2717E-04 | -1.8811E-05 |
| S10 | -1.1280E-01 | 6.7058E-02 | -2.8061E-02 | 7.4137E-03 | -1.2189E-03 | 1.1273E-04 | -4.3889E-06 |

FIG.48

TABLE 5

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.2501 | | |
| S1 | Asphere | 1.2158 | 0.4525 | 1.544,56.11 | -2.1065 |
| S2 | Asphere | 6.5939 | 0.0536 | | -6.4839 |
| S3 | Asphere | 10.5041 | 0.2366 | 1.640,23.53 | -2.0000 |
| S4 | Asphere | 2.6487 | 0.2981 | | -84.9900 |
| S5 | Asphere | 21.7039 | 0.2415 | 1.640,23.53 | -2.0000 |
| S6 | Asphere | 14.2968 | 0.3748 | | -2.0000 |
| S7 | Asphere | -5.1824 | 0.5351 | 1.544,56.11 | -3.4765 |
| S8 | Asphere | -1.1937 | 0.4865 | | -3.3682 |
| S9 | Asphere | -5.7514 | 0.3118 | 1.534,55.77 | -32.4329 |
| S10 | Asphere | 1.5341 | 0.4128 | | -9.9831 |
| S11 | Plano | Inf | 0.2100 | 1.517,64.17 | |
| S12 | Plano | Inf | 0.3367 | | |
| IMA | Plano | Inf | | | |

FIG.49

TABLE 6

| Surface # | A4 | A6 | A8 | A10 | A12 | A14 | A16 |
|---|---|---|---|---|---|---|---|
| S1 | 1.4809E-01 | 8.2359E-02 | -4.6780E-01 | 1.7115E+00 | -3.5799E+00 | 4.3126E+00 | -2.5622E+00 |
| S2 | -2.2226E-01 | 4.2465E-01 | 5.5727E-02 | -1.8101E+00 | 3.5776E+00 | -4.7228E+00 | 2.7033E+00 |
| S3 | -2.7407E-01 | 7.1576E-01 | 2.0163E-01 | -3.9742E+00 | 8.5208E+00 | -9.7254E+00 | 5.1498E+00 |
| S4 | 4.5175E-01 | -1.8465E+00 | 9.3331E+00 | -2.8469E+01 | 5.4230E+01 | -5.8673E+01 | 2.8276E+01 |
| S5 | -3.2931E-01 | 3.7339E-01 | -2.1787E+00 | 8.4319E+00 | -1.8296E+01 | 2.1763E+01 | -1.0896E+01 |
| S6 | -2.2661E-01 | 1.3270E-01 | -4.1176E-01 | 9.6874E-01 | -1.1591E+00 | 9.4515E-01 | -3.5557E-01 |
| S7 | 1.7817E-03 | 5.2466E-02 | -9.3439E-02 | 7.6390E-02 | -3.3991E-02 | 8.0132E-03 | -7.8351E-04 |
| S8 | -2.6795E-02 | -1.0178E-02 | 1.6386E-01 | -1.5820E-01 | 6.5793E-02 | -1.3280E-02 | 1.0609E-03 |
| S9 | -2.2478E-01 | 1.6666E-01 | -6.7758E-02 | 1.8886E-02 | -3.5138E-03 | 3.8401E-04 | -1.8374E-05 |
| S10 | -1.3953E-01 | 9.0991E-02 | -4.4773E-02 | 1.4501E-02 | -2.9319E-03 | 3.2847E-04 | -1.5234E-05 |

FIG.50

TABLE 7

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.2460 | | |
| S1 | Asphere | 1.2521 | 0.4561 | 1.544,56.11 | -2.1019 |
| S2 | Asphere | 6.8298 | 0.0627 | | 9.6650 |
| S3 | Asphere | 12.6402 | 0.2000 | 1.640,23.53 | -9.4523 |
| S4 | Asphere | 2.8529 | 0.4078 | | -89.5927 |
| S5 | Asphere | -13.1925 | 0.2285 | 1.640,23.53 | 99.0000 |
| S6 | Asphere | -21.6630 | 0.4248 | | 99.0000 |
| S7 | Asphere | -8.0738 | 0.6128 | 1.544,56.11 | 2.6163 |
| S8 | Asphere | -1.2327 | 0.5168 | | -3.6892 |
| S9 | Asphere | -6.2180 | 0.2344 | 1.534,55.77 | -40.1953 |
| S10 | Asphere | 1.4203 | 0.4111 | | -8.7851 |
| S11 | Plano | Inf | 0.2100 | 1.517,64.17 | |
| S12 | Plano | Inf | 0.3350 | | |
| IMA | Plano | Inf | | | |

FIG.51

TABLE 8

| Surface # | A4 | A6 | A8 | A10 | A12 | A14 | A16 |
|---|---|---|---|---|---|---|---|
| S1 | 1.4004E-01 | 1.2553E-01 | -7.9239E-01 | 3.4161E+00 | -8.3071E+00 | 1.0900E+01 | -6.0313E+00 |
| S2 | -1.7412E-01 | 1.7025E-01 | 1.1968E+00 | -6.8375E+00 | 1.7509E+01 | -2.3042E+01 | 1.1202E+01 |
| S3 | -2.4345E-01 | 4.8738E-01 | 1.4261E+00 | -1.0170E+01 | 2.7235E+01 | -3.6635E+01 | 1.8919E+01 |
| S4 | 3.8910E-01 | -1.4778E+00 | 7.5851E+00 | -2.2989E+01 | 4.3116E+01 | -4.4700E+01 | 1.9796E+01 |
| S5 | -3.3018E-01 | 2.6070E-01 | -1.5486E+00 | 5.5216E+00 | -1.1196E+01 | 1.2854E+01 | -5.9197E+00 |
| S6 | -2.6541E-01 | 1.6587E-01 | -7.0451E-01 | 1.9658E+00 | -3.0385E+00 | 2.6875E+00 | -9.4587E-01 |
| S7 | 1.1262E-02 | -2.9171E-02 | 5.4483E-02 | -5.5922E-02 | 3.1111E-02 | -8.9324E-03 | 1.0358E-03 |
| S8 | 4.5524E-03 | -9.1079E-02 | 2.3927E-01 | -2.0713E-01 | 8.7840E-02 | -1.8707E-02 | 1.5945E-03 |
| S9 | -2.0657E-01 | 1.5392E-01 | -6.5817E-02 | 1.9134E-02 | -3.5578E-03 | 3.7361E-04 | -1.6756E-05 |
| S10 | -1.2443E-01 | 7.5243E-02 | -3.2364E-02 | 9.0532E-03 | -1.6028E-03 | 1.6162E-04 | -6.9197E-06 |

FIG.52

TABLE 9

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.3170 | | |
| S1 | Asphere | 1.4020 | 0.6350 | 1.544,56.11 | -1.3015 |
| S2 | Asphere | 15.5017 | 0.0272 | | -6.9352 |
| S3 | Asphere | 10.1123 | 0.2500 | 1.640,23.53 | -6.9987 |
| S4 | Asphere | 2.5556 | 0.3398 | | -3.4452 |
| S5 | Asphere | 18.2036 | 0.2618 | 1.640,23.53 | -89.9985 |
| S6 | Asphere | 9.1757 | 0.3300 | | -89.7308 |
| S7 | Asphere | -6.9944 | 0.6422 | 1.544,56.11 | -90.0000 |
| S8 | Asphere | -1.3336 | 0.5760 | | -6.7661 |
| S9 | Asphere | -5.7983 | 0.3300 | 1.544,56.11 | -73.8617 |
| S10 | Asphere | 1.8354 | 0.4256 | | -14.3571 |
| S11 | Plano | Inf | 0.2100 | 1.517,64.17 | |
| S12 | Plano | Inf | 0.3624 | | |
| IMA | Plano | Inf | | | |

FIG.53

TABLE 10

| Surface # | A4 | A6 | A8 | A10 | A12 | A14 | A16 |
|---|---|---|---|---|---|---|---|
| S1 | 5.9518E-02 | 2.7460E-02 | 2.8984E-02 | -2.1846E-01 | 4.0215E-01 | -2.4279E-01 | 0 |
| S2 | -2.8109E-01 | 9.4600E-01 | -1.2753E+00 | 8.3159E-01 | -6.0576E-01 | 2.8556E-01 | 0 |
| S3 | -3.6704E-01 | 1.5161E+00 | -3.0195E+00 | 4.0392E+00 | -3.7274E+00 | 1.5295E+00 | 0 |
| S4 | -9.9749E-02 | 6.6073E-01 | -1.4164E+00 | 2.4869E+00 | -2.5696E+00 | 1.1843E+00 | 0 |
| S5 | -2.7973E-01 | 7.5580E-02 | 5.0844E-02 | -2.0523E-01 | 5.6351E-01 | -3.4840E-01 | 0 |
| S6 | -1.9744E-01 | 2.9045E-02 | 7.8775E-02 | -1.1207E-01 | 1.7706E-01 | -8.1866E-02 | 0 |
| S7 | -5.1881E-02 | 3.6966E-02 | -7.7307E-02 | 1.2408E-01 | -7.9322E-02 | 2.1004E-02 | -1.9451E-03 |
| S8 | -2.2525E-01 | 3.1955E-01 | -3.3790E-01 | 2.6862E-01 | -1.2282E-01 | 2.8268E-02 | -2.5879E-03 |
| S9 | -2.4693E-01 | 1.9347E-01 | -1.0001E-01 | 3.5002E-02 | -7.3661E-03 | 8.2468E-04 | -3.7550E-05 |
| S10 | -9.5783E-02 | 4.2806E-02 | -1.3557E-02 | 2.3762E-03 | -2.0945E-04 | 5.6834E-06 | 2.5228E-07 |

FIG.54

TABLE 11

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.2000 | | |
| S1 | Asphere | 1.5778 | 0.5650 | 1.544,56.11 | -0.9542 |
| S2 | Asphere | 29.7777 | 0.0928 | | -90.0000 |
| S3 | Asphere | -5.6776 | 0.2317 | 1.635,23.78 | 38.3606 |
| S4 | Asphere | 96.5079 | 0.3311 | | -90.0000 |
| S5 | Asphere | -141.7517 | 0.2470 | 1.635,23.78 | -90.0000 |
| S6 | Asphere | 11.2076 | 0.3998 | | -83.2610 |
| S7 | Asphere | -2.7690 | 0.5520 | 1.544,56.11 | -38.2856 |
| S8 | Asphere | -0.9547 | 0.3554 | | -4.4134 |
| S9 | Asphere | 7.4633 | 0.3498 | 1.544,56.11 | -5.0000 |
| S10 | Asphere | 1.0906 | 0.6490 | | -6.1212 |
| S11 | Plano | Inf | 0.2100 | 1.517,64.17 | |
| S12 | Plano | Inf | 0.5800 | | |
| IMA | Plano | Inf | | | |

FIG.55

TABLE 12

| Surface # | A4 | A6 | A8 | A10 | A12 | A14 | A16 |
|---|---|---|---|---|---|---|---|
| S1 | 3.0162E-02 | -7.4756E-02 | 3.2828E-01 | -7.6324E-01 | 7.8370E-01 | -3.2530E-01 | -2.1543E-02 |
| S2 | -1.0223E-01 | 1.4968E-01 | -5.9120E-01 | 1.6534E+00 | -2.6490E+00 | 1.9103E+00 | -4.7285E-01 |
| S3 | -5.4087E-02 | 2.4797E-01 | 9.7033E-02 | -1.2972E+00 | 3.1921E+00 | -3.8798E+00 | 1.9207E+00 |
| S4 | -7.6055E-02 | 2.8138E-01 | -4.0272E-01 | 3.9583E-01 | -3.8109E-01 | 1.2712E-01 | -8.0741E-02 |
| S5 | -3.7839E-01 | -1.5997E-02 | 1.3610E-01 | -4.8705E-01 | 1.0377E+00 | -1.1112E-00 | 3.6914E-01 |
| S6 | -2.5460E-01 | 2.1075E-02 | -9.7314E-02 | 2.9440E-01 | -2.8883E-01 | 9.9215E-02 | 2.7959E-02 |
| S7 | -1.6156E-01 | 5.3674E-01 | -1.3869E+00 | 2.1237E+00 | -1.9523E+00 | 9.8568E-01 | -2.1249E-01 |
| S8 | -2.0074E-01 | 3.8275E-01 | -5.0002E-01 | 4.5636E-01 | -2.4439E-01 | 6.8321E-02 | -7.8010E-03 |
| S9 | -1.5375E-01 | 5.4664E-02 | -1.1560E-02 | 3.2930E-03 | -9.0363E-04 | 1.3538E-04 | -8.2076E-06 |
| S10 | -1.2008E-01 | 6.0865E-02 | -2.5856E-02 | 7.6368E-03 | -1.4536E-03 | 1.5793E-04 | -7.3528E-06 |

FIG.56

TABLE 13

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.3131 | | |
| S1 | Asphere | 1.4352 | 0.5614 | 1.544,56.11 | -9.0073 |
| S2 | Asphere | -21.6798 | 0.0910 | | -12.0001 |
| S3 | Asphere | -3.1972 | 0.2530 | 1.640,23.53 | -7.5850 |
| S4 | Asphere | -162.4521 | 0.2947 | | -11.9994 |
| S5 | Asphere | -13.1648 | 0.2721 | 1.640,23.53 | -12.0000 |
| S6 | Asphere | -215.8999 | 0.5046 | | -12.0000 |
| S7 | Asphere | -7.3586 | 0.7438 | 1.544,56.11 | -12.0000 |
| S8 | Asphere | -0.9572 | 0.2755 | | -5.2375 |
| S9 | Asphere | -4.4003 | 0.2975 | 1.544,56.11 | -32.7204 |
| S10 | Asphere | 1.1769 | 0.2753 | | -8.2237 |
| S11 | Plano | Inf | 0.2100 | 1.517,64.17 | |
| S12 | Plano | Inf | 0.7179 | | |
| IMA | Plano | Inf | | | |

FIG.57

TABLE 14

| Surface # | A4 | A6 | A8 | A10 | A12 | A14 | A16 |
|---|---|---|---|---|---|---|---|
| S1 | 3.6830E-01 | -4.7739E-01 | 7.3081E-01 | -1.1187E+00 | 1.4737E+00 | -1.1717E+00 | 3.2938E-01 |
| S2 | 5.0684E-02 | -4.6682E-04 | -2.7114E-01 | 8.7934E-01 | -1.6880E+00 | 1.4495E+00 | -4.6422E-01 |
| S3 | 2.2079E-01 | -3.7803E-01 | 9.1567E-01 | -1.6596E+00 | 1.7000E+00 | -8.5277E-01 | 1.9954E-01 |
| S4 | 1.9004E-01 | -4.3238E-01 | 1.3538E+00 | -2.9668E+00 | 4.3993E+00 | -4.1845E+00 | 2.1125E+00 |
| S5 | -2.3798E-01 | -3.8251E-01 | 1.6336E+00 | -4.2491E+00 | 6.2710E+00 | -4.9044E+00 | 1.8542E+00 |
| S6 | -1.9597E-01 | -4.5855E-02 | 3.9405E-01 | -1.0609E+00 | 1.6997E+00 | -1.3288E+00 | 4.3538E-01 |
| S7 | -1.1652E-03 | 1.5987E-02 | -1.2903E-01 | 2.1768E-01 | -1.6203E-01 | 5.6643E-02 | -7.8881E-03 |
| S8 | -1.8773E-01 | 3.6977E-01 | -5.4130E-01 | 4.8921E-01 | -2.3964E-01 | 5.9067E-02 | -5.7895E-03 |
| S9 | -8.7961E-02 | -6.8653E-02 | 9.2963E-02 | -4.1740E-02 | 9.5324E-03 | -1.0797E-03 | 4.5822E-05 |
| S10 | -1.1345E-01 | 4.8637E-02 | -1.5642E-02 | 3.0246E-03 | -3.0590E-04 | 4.3669E-06 | 1.3023E-06 |

FIG.58

TABLE 15

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.2144 | | |
| S1 | Asphere | 1.3031 | 0.5204 | 1.544,56.11 | -11.6919 |
| S2 | Asphere | 7.9875 | 0.0423 | | -45.8345 |
| S3 | Asphere | 15.1404 | 0.2180 | 1.640,23.53 | -90.0000 |
| S4 | Asphere | 3.2520 | 0.4123 | | -86.1697 |
| S5 | Asphere | 7.4615 | 0.2320 | 1.640,23.53 | -77.1782 |
| S6 | Asphere | 5.1659 | 0.3518 | | -48.5359 |
| S7 | Asphere | -4.4375 | 0.5766 | 1.544,56.11 | -5.0000 |
| S8 | Asphere | -0.9071 | 0.2570 | | -2.8711 |
| S9 | Asphere | -6.4021 | 0.3476 | 1.534,55.77 | -5.5113 |
| S10 | Asphere | 1.1984 | 0.4903 | | -8.4906 |
| S11 | Plano | Inf | 0.2100 | 1.517,64.17 | |
| S12 | Plano | Inf | 0.4218 | | |
| IMA | Plano | Inf | | | |

FIG.59

TABLE 16

| Surface # | A4 | A6 | A8 | A10 | A12 | A14 | A16 |
|---|---|---|---|---|---|---|---|
| S1 | 6.3832E-01 | -1.5300E+00 | 3.7352E+00 | -6.7043E-00 | 7.5004E+00 | -4.5553E+00 | 9.6585E-01 |
| S2 | -3.0431E-01 | 6.0985E-01 | -2.4296E-01 | -1.5518E-00 | 3.3350E+00 | -3.1217E+00 | 1.0940E-00 |
| S3 | -3.2425E-01 | 8.6273E-01 | 5.9182E-01 | -7.1628E-00 | 1.7182E+01 | -1.8876E+01 | 8.1299E-00 |
| S4 | 2.2354E-01 | -3.9438E-01 | 2.6522E+00 | -8.5638E-00 | 1.6397E+01 | -1.6645E+01 | 7.1393E-00 |
| S5 | -3.7715E-01 | 4.9856E-01 | -2.7437E+00 | 8.4472E-00 | -1.5390E+01 | 1.5162E+01 | -5.9377E-00 |
| S6 | -2.9853E-01 | 4.6376E-01 | -1.9393E+00 | 4.4224E-00 | -5.8903E+00 | 4.2847E+00 | -1.2361E-00 |
| S7 | -2.7486E-02 | 1.8112E-01 | -2.6784E-01 | 1.4726E-01 | -3.2493E-02 | 2.1715E-03 | 4.1971E-05 |
| S8 | 3.6444E-02 | -1.3488E-01 | 3.7866E-01 | -3.6926E-01 | 1.7388E-01 | -4.0842E-02 | 3.8521E-03 |
| S9 | -5.2563E-02 | -2.1227E-02 | 3.4808E-02 | -1.3338E-02 | 2.4245E-03 | -2.1491E-04 | 7.2106E-06 |
| S10 | -9.6761E-02 | 4.4126E-02 | -1.9808E-02 | 6.4152E-03 | -1.3982E-03 | 1.7660E-04 | -9.3023E-06 |

FIG.60

TABLE 17

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.2501 | | |
| S1 | Asphere | 1.2158 | 0.4525 | 1.544,56.11 | -2.1065 |
| S2 | Asphere | 6.5939 | 0.0536 | | -6.4839 |
| S3 | Asphere | 10.5041 | 0.2366 | 1.640,23.53 | -2.0000 |
| S4 | Asphere | 2.6487 | 0.2981 | | -84.9900 |
| S5 | Asphere | 21.7039 | 0.2415 | 1.640,23.53 | -2.0000 |
| S6 | Asphere | 14.2968 | 0.3748 | | -2.0000 |
| S7 | Asphere | -5.1824 | 0.5351 | 1.544,56.11 | -3.4765 |
| S8 | Asphere | -1.1937 | 0.4865 | | -3.3682 |
| S9 | Asphere | -5.7514 | 0.3118 | 1.534,55.77 | -32.4329 |
| S10 | Asphere | 1.5341 | 0.4128 | | -9.9831 |
| S11 | Plano | Inf | 0.2100 | 1.517,64.17 | |
| S12 | Plano | Inf | 0.3367 | | |
| IMA | Plano | Inf | | | |

FIG.61

TABLE 18

| Surface # | A4 | A6 | A8 | A10 | A12 | A14 | A16 |
|---|---|---|---|---|---|---|---|
| S1 | 1.4809E-01 | 8.2359E-02 | -4.6780E-01 | 1.7115E+00 | -3.5799E+00 | 4.3126E+00 | -2.5622E+00 |
| S2 | -2.2226E-01 | 4.2465E-01 | 5.5727E-02 | -1.8101E-00 | 3.5776E+00 | -4.7228E+00 | 2.7033E+00 |
| S3 | -2.7407E-01 | 7.1576E-01 | 2.0163E-01 | -3.9742E-00 | 8.5208E+00 | -9.7254E+00 | 5.1498E+00 |
| S4 | 4.5175E-01 | -1.8465E+00 | 9.3331E+00 | -2.8469E-01 | 5.4230E+01 | -5.8673E+01 | 2.8276E+01 |
| S5 | -3.2931E-01 | 3.7339E-01 | -2.1787E+00 | 8.4319E-00 | -1.8296E+01 | 2.1763E+01 | -1.0896E+01 |
| S6 | -2.2661E-01 | 1.3270E-01 | -4.1176E-01 | 9.6874E-01 | -1.1591E+00 | 9.4515E-01 | -3.5557E-01 |
| S7 | 1.7817E-03 | 5.2466E-02 | -9.3439E-02 | 7.6390E-02 | -3.3991E-02 | 8.0132E-03 | -7.8351E-04 |
| S8 | -2.6795E-02 | -1.0178E-02 | 1.6386E-01 | -1.5820E-01 | 6.5793E-02 | -1.3280E-02 | 1.0609E-03 |
| S9 | -2.2478E-01 | 1.6666E-01 | -6.7758E-02 | 1.8886E-02 | -3.5138E-03 | 3.8401E-04 | -1.8374E-05 |
| S10 | -1.3953E-01 | 9.0991E-02 | -4.4773E-02 | 1.4501E-02 | -2.9319E-03 | 3.2847E-04 | -1.5234E-05 |

FIG.62

TABLE 19

| Surface # | Surface Type | Curvature Radius | Thickness | Refractive Index /Abbe. # | Conic coefficient |
|---|---|---|---|---|---|
| OBJ | Plano | Inf | Inf | | |
| STO | Plano | Inf | -0.2609 | | |
| S1 | Asphere | 1.3538 | 0.5847 | 1.544,56.11 | -12.2016 |
| S2 | Asphere | 6.8544 | 0.0570 | | 0.4819 |
| S3 | Asphere | 13.3023 | 0.2200 | 1.640,23.53 | -15.8346 |
| S4 | Asphere | 3.5395 | 0.3611 | | -39.7316 |
| S5 | Asphere | 79.0066 | 0.2400 | 1.640,23.53 | 46.6810 |
| S6 | Asphere | 10.9205 | 0.2296 | | 30.7385 |
| S7 | Asphere | -4.7011 | 0.6287 | 1.544,56.11 | -0.2158 |
| S8 | Asphere | -1.1838 | 0.6219 | | -2.3422 |
| S9 | Asphere | -8.9249 | 0.3014 | 1.534,55.77 | 7.2869 |
| S10 | Asphere | 1.5600 | 0.3877 | | -10.1710 |
| S11 | Plano | Inf | 0.2100 | 1.517,64.17 | |
| S12 | Plano | Inf | 0.3478 | | |
| IMA | Plano | Inf | | | |

FIG.63

TABLE 20

| Surface # | A4 | A6 | A8 | A10 | A12 | A14 | A16 |
|---|---|---|---|---|---|---|---|
| S1 | 6.0015E-01 | -1.3902E+00 | 3.3726E+00 | -5.9083E-00 | 6.6101E+00 | -4.0841E+00 | 9.7700E-01 |
| S2 | -2.3827E-01 | 3.9755E-01 | 1.4293E-01 | -2.1819E-00 | 4.3862E+00 | -4.5093E+00 | 1.9423E+00 |
| S3 | -3.1647E-01 | 7.9586E-01 | -3.6134E-01 | -1.9424E-00 | 4.6251E+00 | -4.8062E+00 | 2.1371E+00 |
| S4 | -2.1360E-02 | 2.4598E-01 | 9.9140E-01 | -5.8836E-00 | 1.3648E+01 | -1.5580E+01 | 7.4102E+00 |
| S5 | -4.2660E-01 | 9.1478E-02 | 1.9893E-01 | -2.0898E-00 | 5.4118E+00 | -6.2169E+00 | 2.9875E+00 |
| S6 | -3.4767E-01 | 2.6474E-01 | -5.8746E-01 | 1.1307E+00 | -1.4212E+00 | 1.0962E+00 | -3.2224E-01 |
| S7 | -1.6388E-02 | 9.5974E-02 | -5.2078E-02 | 1.3743E-02 | -2.9625E-03 | 5.7045E-04 | -5.3171E-05 |
| S8 | -2.1257E-02 | -1.0885E-02 | 1.3414E-01 | -9.8780E-02 | 2.9119E-02 | -3.6423E-03 | 1.2417E-04 |
| S9 | -2.6326E-01 | 2.8414E-01 | -2.1046E-01 | 9.5630E-02 | -2.4411E-02 | 3.2454E-03 | -1.7617E-04 |
| S10 | -1.2904E-01 | 9.3239E-02 | -4.8557E-02 | 1.5077E-02 | -2.7664E-03 | 2.7837E-04 | -1.1775E-05 |

FIG.64

TABLE 21

| Expression/Example | 1 | 2 | 3 | 4 | 5 | 6 | 7 | 8 | 9 | 10 |
|---|---|---|---|---|---|---|---|---|---|---|
| TTL/ImgH | 1.44 | 1.50 | 1.46 | 1.35 | 1.39 | 1.43 | 1.36 | 1.43 | 1.35 | 1.41 |
| ΣAT/Td | 0.38 | 0.38 | 0.35 | 0.41 | 0.36 | 0.39 | 0.45 | 0.44 | 0.41 | 0.45 |
| f/f12 | 0.83 | 0.88 | 0.91 | 0.82 | 0.83 | 0.82 | 0.82 | 0.84 | 0.82 | 0.81 |
| |f5/R9| | 0.43 | 0.32 | 0.38 | 0.39 | 0.29 | 0.27 | 0.34 | 0.43 | 0.39 | 0.34 |
| R10/R9 | -0.32 | 0.15 | -0.27 | -0.27 | -0.19 | -0.17 | -0.23 | -0.31 | -0.27 | -0.23 |
| f1/f4 | 0.96 | 1.26 | 1.28 | 0.98 | 1.41 | 1.09 | 1.02 | 1.03 | 0.98 | 1.06 |
| CT3/CT4 | 0.41 | 0.45 | 0.37 | 0.45 | 0.40 | 0.38 | 0.45 | 0.35 | 0.45 | 0.37 |
| ET4/CT4 | 0.36 | 0.53 | 0.36 | 0.45 | 0.49 | 0.41 | 0.41 | 0.50 | 0.45 | 0.46 |
| ET3min/ET3max | 0.86 | 0.65 | 0.78 | 0.87 | 0.81 | 0.73 | 0.90 | 0.86 | 0.87 | 0.90 |
| ET5/ET5max | 0.58 | 0.64 | 0.56 | 0.51 | 0.50 | 0.62 | 0.48 | 0.59 | 0.51 | 0.58 |
| FLmin/TTL | 0.20 | 0.27 | 0.23 | 0.21 | 0.23 | 0.19 | 0.20 | 0.19 | 0.21 | 0.20 |
| f/f3 | -0.13 | -0.24 | -0.18 | -0.05 | -0.13 | -0.18 | -0.06 | -0.12 | -0.05 | -0.07 |
| f/f1-|f/f2| | 0.65 | 0.80 | 0.78 | 0.68 | 0.71 | 0.72 | 0.69 | 0.71 | 0.68 | 0.68 |
| T12/(T23+T34+T45) | 0.02 | 0.09 | 0.08 | 0.05 | 0.04 | 0.05 | 0.05 | 0.05 | 0.05 | 0.05 |

FIG.65

IMAGE PICKUP OPTICAL LENS SYSTEM

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an optical lens system, and more particularly to an image pickup optical lens system applicable to electronic products, such as smart phones, iPads, and notebooks, as mobile device camera.

Description of Related Arts

With the popularity of mobile products with camera functions, compact lens modules are greatly demanded in the smart phone market. While conventional camera generally uses Charge Coupled Device (CCD) or Complementary Metal-Oxide Semiconductor (CMOS) sensors, there is an increasing demand for compact imaging lens apparatus featuring better image quality.

Conventional lens apparatus for electronic device mainly uses four lenses or five lenses system. While the demand of imaging lens apparatus for electronic device, such as smart phone, tablet, notebook, and etc., the conventional four lenses or five lenses system does not meet such requirement and thus high resolution and performance with compact size optical lens apparatus is a need to develop in the market of electronic products nowadays.

SUMMARY OF THE PRESENT INVENTION

The invention is advantageous in that it provides an image pickup optical lens system which comprises an optical lens system for forming a subject image on a photoelectric conversion section of a solid image pickup element and an image pickup lens comprising, in order from an object side to an image side, a first lens, a second lens, a third lens, a fourth lens, and a fifth lens, the first lens having a positive focal power with a convex surface on an object side thereof and a concave surface on an image side thereof, the second lens having a negative focal power, the third lens having a negative focal power, the fourth lens having a positive focal power with a concave surface on an object side thereof and a convex surface on an image side thereof, the fifth lens having a negative focal power with a concave surface on an image side thereof.

In one embodiment, the optical lens system satisfies the following conditional expressions:

$$TTL/ImgH \leq 1.50$$

$$0.35 \leq \Sigma AT/Td < 0.50$$

$$0.8 < f/f12 < 0.92$$

$$0.25 < |f5/R9| < 0.60$$

$$|R10/R9| \leq 0.32$$

$$0.95 \leq f1/f4 < 1.45$$

$$0.34 < CT3/CT4 < 0.46$$

$$0.35 < ET4/CT4 < 0.55$$

$$0.65 \leq ET3min/ET3max < 0.95$$

$$0.45 < ET5/ET5max < 0.65$$

$$0.15 < FLmin/TTL < 0.3$$

$$|f/f3| < 0.25$$

$$0.6 < f/f1 - |f/f2| < 0.85$$

$$T12/(T23+T34+T45) < 0.1$$

where, f denotes a focal length of the optical lens system, f1 denotes a focal length of the first lens, f12 denotes a focal length of a combination lens group of the first lens and the second lens, f2 denotes a focal length of the second lens, f3 denotes a focal length of the third lens, f4 denotes a focal length of the fourth lens, f5 denotes a focal length of the fifth lens, TTL denotes an axial distance between the object side of the first lens and an image plane, ImgH denotes a half of a diagonal length of an effective pixel area of the image plane, $\Sigma AT$ denotes a sum of axial distances between each two adjacent lenses of the five lenses, Td denotes an axial distance between the object side of the first lens and the image side of the fifth lens, R9 denotes a radius of a curvature of an object side of the fifth lens, R10 denotes a radius of a curvature of the image side of the fifth lens, CT3 denotes a central thickness of the third lens, CT4 denotes a central thickness of the fourth lens, ET4 denotes an edge thickness at the utmost effective radius of the fourth lens, ET3min denotes a minimum horizontal thickness between a center and a peripheral edge of the third lens, ET3max denotes a maximum horizontal thickness between a center and a peripheral edge of the third lens, ET5 denotes an edge thickness at the utmost effective radius of the fifth lens, ET5max denotes a maximum horizontal thickness between a center and a peripheral edge of the fifth lens, FLmin denotes a horizontal distance between a critical point of the image side of the fifth lens and the image plane, T12 denotes an axial distance between the first lens and the second lens, T23 denotes an axial distance between the second lens and the third lens, T34 denotes an axial distance between the third lens and the fourth lens, T45 denotes an axial distance between the fourth lens and the fifth lens.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 45 is TABLE 1 which lists the optical data of the image pickup optical lens system according to the first example of the preferred embodiment of the present invention.

FIG. 46 is TABLE 2 which lists the aspheric coefficients of the image pickup optical lens system according to the first example of the preferred embodiment of the present invention FIG. 47 is TABLE 3 which lists the optical data of the image pickup optical lens system according to the second example of the preferred embodiment of the present invention.

FIG. 48 is TABLE 4 which lists the aspheric coefficients of the image pickup optical lens system according to the second example of the preferred embodiment of the present invention.

FIG. 49 is TABLE 5 which lists the optical data of the image pickup optical lens system according to the third example of the preferred embodiment of the present invention.

FIG. 50 is TABLE 6 which lists the aspheric coefficients of the image pickup optical lens system according to the third example of the preferred embodiment of the present invention.

FIG. 51 is TABLE 7 which lists the optical data of the image pickup optical lens system according to the fourth example of the preferred embodiment of the present invention.

FIG. 52 is TABLE 8 which lists the aspheric coefficients of the image pickup optical lens system according to the fourth example of the preferred embodiment of the present invention.

FIG. 53 is TABLE 9 which lists the optical data of the image pickup optical lens system according to the fifth example of the preferred embodiment of the present invention.

FIG. 54 is TABLE 10 which lists the aspheric coefficients of the image pickup optical lens system according to the fifth example of the preferred embodiment of the present invention.

FIG. 55 is TABLE 11 which lists the optical data of the image pickup optical lens system according to the sixth example of the preferred embodiment of the present invention.

FIG. 56 is TABLE 12 which lists the aspheric coefficients of the image pickup optical lens system according to the sixth example of the preferred embodiment of the present invention.

FIG. 57 is TABLE 13 which lists the optical data of the image pickup optical lens system according to the seventh example of the preferred embodiment of the present invention.

FIG. 58 is TABLE 14 which lists the aspheric coefficients of the image pickup optical lens system according to the seventh example of the preferred embodiment of the present invention.

FIG. 59 is TABLE 15 which lists the optical data of the image pickup optical lens system according to the eighth example of the preferred embodiment of the present invention.

FIG. 60 is TABLE 16 which lists the aspheric coefficients of the image pickup optical lens system according to the eighth example of the preferred embodiment of the present invention.

FIG. 61 is TABLE 17 which lists the optical data of the image pickup optical lens system according to the ninth example of the preferred embodiment of the present invention.

FIG. 62 is TABLE 18 which lists the aspheric coefficients of the image pickup optical lens system according to the ninth example of the preferred embodiment of the present invention.

FIG. 63 is TABLE 19 which lists the optical data of the image pickup optical lens system according to the tenth example of the preferred embodiment of the present invention.

FIG. 64 is TABLE 20 which lists the aspheric coefficients of the image pickup optical lens system according to the tenth example of the preferred embodiment of the present invention.

FIG. 65 is TABLE 21 which lists the specific values of the conditional expressions of the image pickup optical lens system according to the above ten examples of the preferred embodiments of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
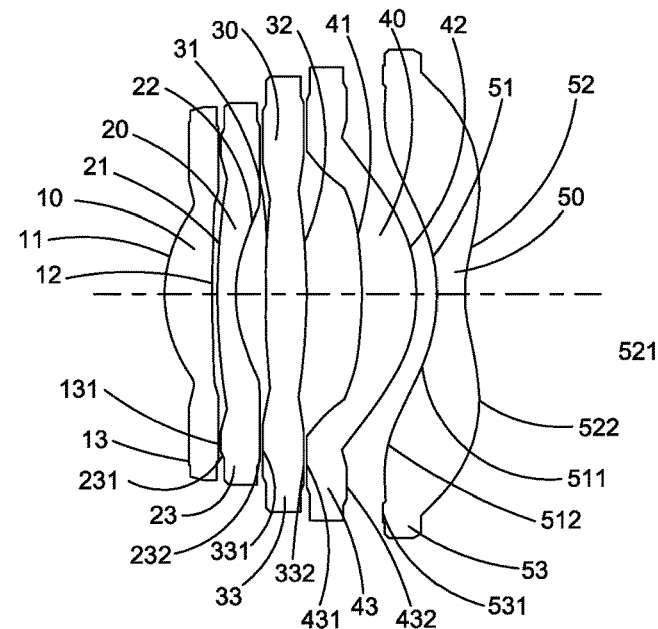
FIG. 1 is a schematic view of an image pickup optical lens system according to the preferred embodiment of the present invention

In an image pickup optical lens system for forming a subject image on a photoelectric conversion section of the solid image pickup element 90 and the image pickup lens according to a preferred embodiment, as shown in FIGS. 1 and 2, comprises, in order from an object side to an image side, a first lens 10, a second lens 20, a third lens 30, a fourth lens 40, and a fifth lens 50.

The first lens 10 has a positive focal power with a convex surface on its object side 11 and a concave surface on its image side 12.

The second lens 20 has a negative focal power.

The third lens 30 has a negative focal power.

The fourth lens 40 has a positive focal power with a concave surface on its object side 41 and a convex surface on its image side 42.

The fifth lens 50 has a negative focal power with a concave surface on its image side 52.

According to the preferred embodiment of the present invention, the optical lens system further comprises an aperture stop 70 located at the object side of the first lens 10, and at least one flat element 60 located between the fifth lens 50 and an image plane 91 of the solid image pickup element 90. The flat element 60 can be embodied as an IR filter.

According to the preferred embodiment of the present invention, an axial distance between the object side 11 of the first lens 10 and the image plane is TTL and a half of a diagonal length of an effective pixel area of the solid image pickup element of the optical lens system of the present invention is ImgH, and the relationship between the TTL and ImgH is:

$$TTL/ImgH \leq 1.50. \quad (1)$$

$\Sigma AT$ is a sum of axial distances between each two adjacent lenses of the five lenses, Td is an axial distance between the object side 11 of the first lens 10 and the image side 52 of the fifth lens 50, and the relationship between $\Sigma AT$ and Td is:

$$0.35 \leq \Sigma AT/Td < 0.50. \quad (2)$$

It should be noted that expressions (1) and (2) explicate an advantage of a compact dimension of the optical lens system of the present invention.

A focal length of the optical lens system is f, f12 is a focal length of a combination lens group of the first lens 10 and the second lens 20, and the relationship between f and f12 is:

$$0.8 < f/f12 < 0.92. \quad (3)$$

It is appreciated that the first lens 10 is cooperative with the second lens 20 to satisfy the above conditional expression (3), so that it is beneficial for color calibration.

A focal length of the fifth lens 50 is f5, a radius of a curvature of an object side 51 of the fifth lens 50 is R9, and the relationship between f5 and R9 is:

$$0.25 < |f5/R9| < 0.60. \quad (4)$$

A radius of a curvature of the image side 52 of the fifth lens 50 is R10, and the relationship between R9 and R10 is:

$$|R10/R9| < 0.32. \quad (5)$$

The expressions (4) and (5) render that it is convenient to calibrate a distortion of the optical lens system of the present invention, so as to provide a system with little distortion.

A focal length of the first lens 10 is f1, f4 is a focal length of fourth lens 40, and f1 and f4 satisfy the following relationships:

$$0.95 \leq f1/f4 < 1.45. \quad (6)$$

This expression (6) explicates that the first lens 10 and the fourth lens are cooperative in rendering a convenient calibration of a lateral color aberration.

A central thickness of the third lens 30 is CT3, a central thickness of the fourth lens 40 is CT4, and the relationship between CT3 and CT4 is:

$$0.34 < CT3/CT4 < 0.46. \quad (7)$$

An edge thickness at the utmost effective radius of the fourth lens 40 is ET4, and the relationship between ET4 and CT4 is:

$$0.35 < ET4/CT4 < 0.55. \quad (8)$$

A minimum horizontal thickness between a center of the third lens 30 and a peripheral edge of the third lens 30 is ET3min, a maximum horizontal thickness between the center of the third lens 30 and the peripheral edge of the third lens 30 is ET3max, and the relationship between ET3min and ET3max is:

$$0.65 \leq ET3min/ET3max < 0.95. \quad (9)$$

An edge thickness at the utmost effective radius of the fifth lens 50 is ET5, a maximum horizontal thickness between a center of the fifth lens 50 and a peripheral edge of the fifth lens 50 is ET5max, and the relationship between ET5 and ET5max is:

$$0.45 < ET5/ET5max < 0.65. \quad (10)$$

It is worth mentioning that the above conditional expressions (7), (8), (9) and (10) explicates an advantage of controlling a size of the optical lens system, so as to fit a relatively small dimension requirement.

A horizontal distance between a critical point of the image side 52 of the fifth lens 50 and the image plane 91 is FLmin. The critical point of the image side 52 of the fifth lens 50 is a transition position at which a radius of a curvature of the image side 52 of the fifth lens 50 is transited between a positive radius of a curvature and a negative radius of a curvature. The relation between FLmin and TTL is:

$$0.15 < FLmin/TTL < 0.3. \quad (11)$$

The condition illustrated in the expression (11) is beneficial for optimizing the distribution of the focal power of the optical lens system, reducing an optical length of the optical lens system, and at the same time, ensuring a balance of various types of optical aberrations.

A focal length of the second lens 20 is f2, a focal length of the third lens 30 is f3, and f, f1, f2 and f3 satisfy the following conditional expressions:

$$|f/f3| < 0.25, \quad (12)$$

$$0.6 < |f/f1| - |f/f2| < 0.85. \quad (13)$$

It is worth mentioning that the conditional expressions (12) and (13) are able to ensure a restricted distortion shape of the optical lens system, so as to obtain a desired photographing experience.

An axial distance between the first lens 10 and the second lens 20 is T12, an axial distance between the second lens 20 and the third lens 30 is T23, an axial distance between the third lens 30 and the fourth lens 40 is T34, an axial distance between the fourth lens 40 and the fifth lens 50 is T45, and the relationship between T12, T23, T34 and T45 is:

$$T12/(T23+T34+T45) < 0.1. \quad (14)$$

It is understandable that the relationship shown in the conditional expression (14) is advantageous in controlling the size of the structure of the optical lens system of the present invention, rendering a small dimension, as well as ensuring a balance between various types of optical aberrations.

Figure 2:
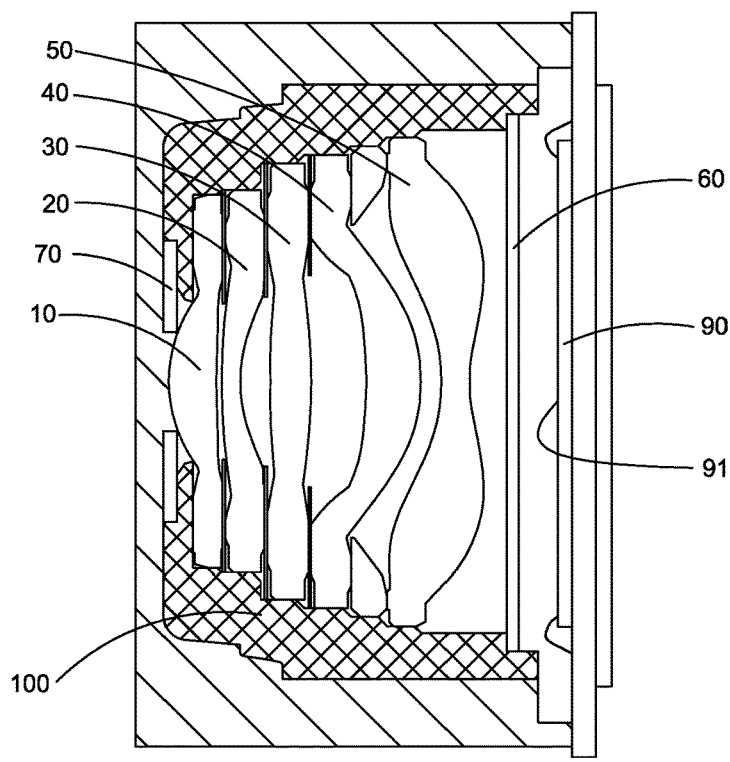
FIG. 2 is a schematic cross sectional view showing outline of an image pickup apparatus equipped with an optical lens system according to the preferred embodiment of the present invention.

FIG. 2 is a schematic cross sectional view showing the outline of an image pickup apparatus equipped with the optical lens system of the present invention as shown in FIG. 1 by enclosing within a lens barrel 100, which may be bonded to a substrate mount with a solid pickup element 90, such as an image sensor, having the photoelectric conversion surface on the object side, wherein external electrode, being connected with control section external to the image pickup apparatus, may be formed on the substrate in such a manner that operation control signals are inputted or outputted.

Figure 3:
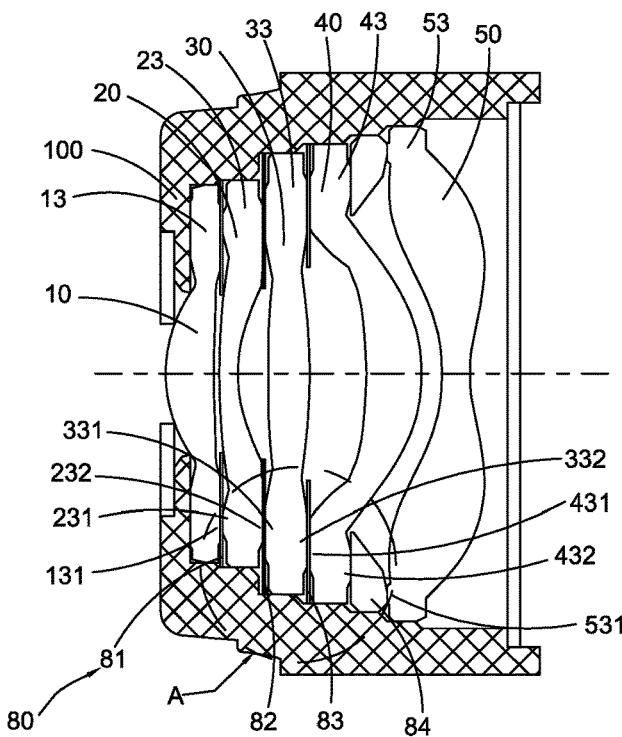
FIG. 3 is a schematic cross sectional view illustrating the optical lens system being assembled with separators according to the preferred embodiment of the present invention.
Figure 4:
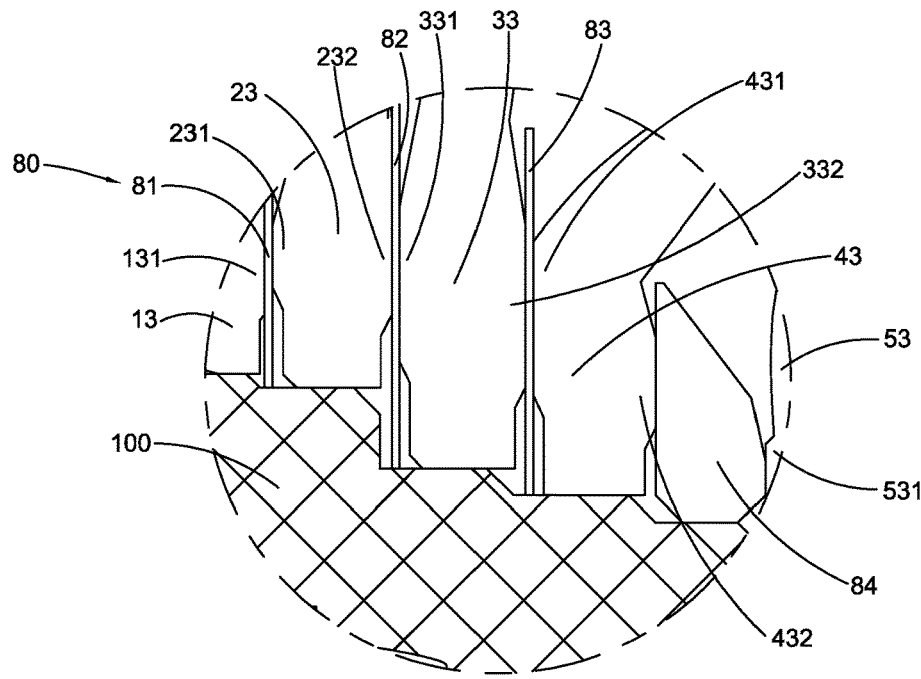
FIG. 4 is a partial enlarged view illustrating a separator laminated between two lenses of the image pickup optical lens system according to the preferred embodiment of the present invention.

More specifically, according to this preferred embodiment, as shown in FIGS. 2-4 of the drawings, the image pickup optical lens system further comprises a lens barrel 100 and a plurality of ring shaped separators 80. Accordingly, the lenses 10, 20, 30, 40 and 50 are housed in the lens barrel 100, and a separator is provided between each two adjacent lenses. More specifically, the plurality of separators 80 of this preferred embodiment comprises of a first separator 81 which is laminated between the first lens 10 and the second lens 20, a second separator 82 which is laminated between the second lens 20 and the third lens 30, a third separator 83 which is laminated between the third lens 30 and the fourth lens 40, and a fourth separator 84 which is laminated between the fourth lens 40 and the fifth lens 50.

Accordingly, it is understandable that each of the separators 80 may comprise a light-impermeable and light-absorbing material, and a pore diameter of each of the separators 80 is configured to have a suitable size that allows desired light beams to pass through each of the lenses 10, 20, 30, 40 and 50 while prevents unwanted light beams from reaching to the image plane. As shown in the drawings, in a direction from an object side to an image side, the lens barrel 100 has increasing inner diameters to match with outer diameters of the lenses 10, 20, 30, 40 and 50, and the plurality of separators 80 may be correspondingly constructed to have increasing pore diameters. In addition, light beams reflected on an inner wall of the lens barrel 100 also can be absorbed by the plurality of separators 80. Therefore, the plurality of separators 80 provides an effective light sheltering function. Furthermore, when being made of resilient material, each of the separators 80 sandwiched between two adjacent lenses can provide a cushioning function to the two adjacent lenses for preventing unwanted scratch of the two adjacent lenses.

As shown in the drawings, according to this preferred embodiment of the present invention, each of the lenses 10, 20, 30, 40 and 50 comprises at least one mounting end, i.e. an outer circumferential mounting end or two mounting end provided at two opposite sides of each lens, for mounting each lens in position in the lens barrel 100. In this embodiment, an outer circumferential portion of each lens forms the mounting end. In other words, each lens comprises a central lens body and a circumferential portion integrally extended from the central lens body, and the circumferential portion is provided around the central lens body to form the mounting end. Accordingly, the central lens body of each lens is provided for refracting light beams, while the mounting end is biasing against the inner wall of the lens barrel 100 for retaining each lens in the lens barrel 100.

Accordingly, the plurality of separators 80 is respectively stacked with the mounting ends of the lenses 10, 20, 30, 40 and 50 to define an effective optical operation area of the central lens body of each lens. As shown in the drawings, each separator is actually laminated between two mounting ends of two adjacent lenses. In addition, according to this preferred embodiment, each mounting end is provided with upper or lower mounting portions for laminating with the adjacent separator.

More specifically, the lenses 10, 20, 30, 40, and 50 comprise a first mounting end 13, a second mounting end 23, a third mounting end 33, a fourth mounting end 43, and a fifth mounting end 53 circumferentially and integrally extended from the central lens body thereof respectively. As shown in the drawings, The first mounting end 13 comprises a first lower mounting portion 131 at a bottom side thereof, the second mounting end 23 comprises a second upper mounting portion 231 and a second lower mounting portion 232 at a top side and a bottom side thereof respectively, the third mounting end 33 comprises a third upper mounting portion 331 and a third lower mounting portion 332 at a top side and a bottom side thereof respectively, the fourth mounting end 43 comprises a fourth upper mounting portion 431 and a fourth lower mounting portion 432 at a top side and a bottom side thereof respectively, and the fifth mounting end 53 comprises a fifth upper mounting portion 531. Accordingly, it is appreciated that each of the upper and lower mounting portions can be embodied as a protrusion portion for laminating and contacting with the adjacent separator.

Referring to FIGS. 3 and 4 of the drawings, the first lens 10 is laminated and retained between the upper inner wall of the lens barrel 100 and the first separator 81, the second lens 20 is laminated and retained between the first and second separators 81 and 82, the third lens 30 is laminated and retained between the second and third separators 82 and 83, the fourth lens 40 is laminated and retained between the third and fourth separators 83 and 84, and the fifth lens 50 is laminated to the fourth separator 84. Correspondingly, the first separator 81 is laminated between the first lower mounting portion 131 of the first lens 10 and the second upper mounting portion 231 of the second lens 20, the second separator 82 is laminated between the second lower mounting portion 232 of the second lens 20 and the third upper mounting portion 331 of the third lens 30, the third separator 83 is laminated between the third lower mounting portion 332 of the third lens 30 and the fourth upper mounting portion 431 of the fourth lens 40, and the fourth separator 84 is laminated between the fourth lower mounting portion 432 of the fourth lens 40 and the fifth upper mounting portion 531 of the fifth lens 50. Therefore, a compact and stable structure of the image pickup optical lens system is formed.

Referring to FIGS. 3 and 4 of the drawings, at least a part of a lateral surface of each circumferential mounting end of each lens is spaced apart from the inner wall of the lens barrel 100, so as to reduce a contact area between the circumferential mounting end of each lens and the inner wall of the lens barrel 100. According to this preferred embodiment, an upper part of each circumferential mounting end of lens is embodied to have a slope surface to space apart from the inner wall of the lens barrel 100. In other words, the mounting end of each lens has reduced and tapered thickness so as to reduce a frictional contact area between the mounting end and the inner wall of the lens barrel 100, as well as to reduce a frictional contact area between the mounting end and the adjacent separator.

It is worth mentioning that a surface of each of the lenses 10, 20, 30, 40 and 50 has a substantial smooth curvature, so that they are easy for manufacturing and convenient for forming in shape. It is appreciated that air layers between two lens bodies of each two adjacent lenses are as even as possible, so that it is convenient for the assembling process.

The configuration of the plurality of separators 80 provides an effective light sheltering and cushioning performance.

According to this preferred embodiment, the structure of the image pickup optical lens system is modified and the values and relationship of the parameters of the image pickup optical lens system are selected so as to fit for the high resolution and quality needs and expectation for the smart devices. A person skilled in the art will understand that the configuration and the specification of the image pickup optical lens system of this embodiment ensure a high resolution performance, enable a comparatively thin shape and a relatively large field of view, and also effectively rectify a lens distortion.

It is still worth mentioning that the fifth lens 50 of this preferred embodiment is embodied to have a configuration which has a central indention shape and is gradually changed to a protrusion shape at an outer peripheral side at both of the object side 51 and the image side 52 thereof. More specifically, the object side 51 of the fifth lens 50 comprises a first central concave portion 511, and a first convex portion 512 circumferentially and integrally extended from the first central concave portion 511, the image side 52 of the fifth lens 50 comprises a second central concave portion 521, and a second convex portion 522 circumferentially and integrally extended from the second central concave portion 521. Accordingly, the convex portions 512 and 522 is respectively extended between the central concave portions 511 and 521 and the mounting end 53 below the fourth separator 84, rendering the shape of the fifth lens 50 gradually changed from an indention to a protrusion at both of the object side 51 and the image side 52 thereof. Such configuration of the fifth lens 50 effectively reduces a light incident angle, enhances an relative illumination performance, obtains an even distributed brightness from the circumferential edge to the center thereof, and thus the image quality of the image pickup optical lens system is achieved.

Figure 5:
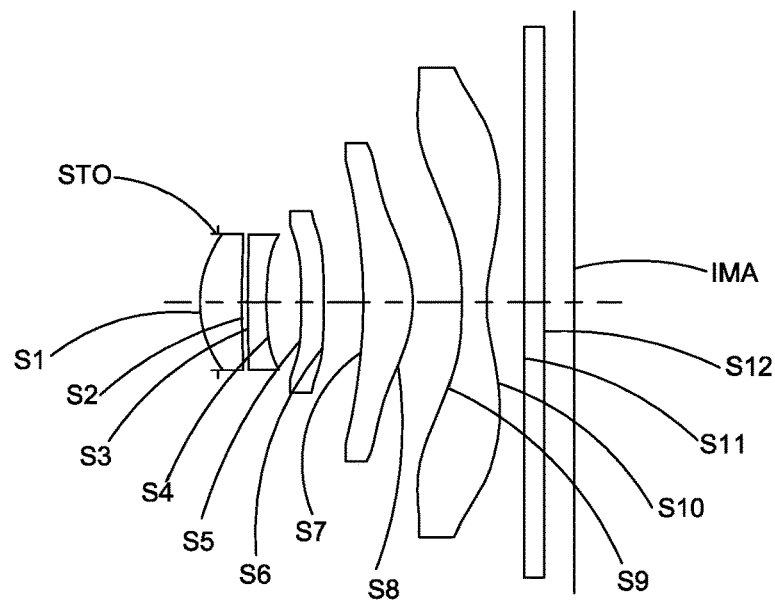
FIG. 5 is a schematic view illustrating the optical structure of the image pickup optical lens system according to a first example of the preferred embodiment of the present invention.
Figure 6:
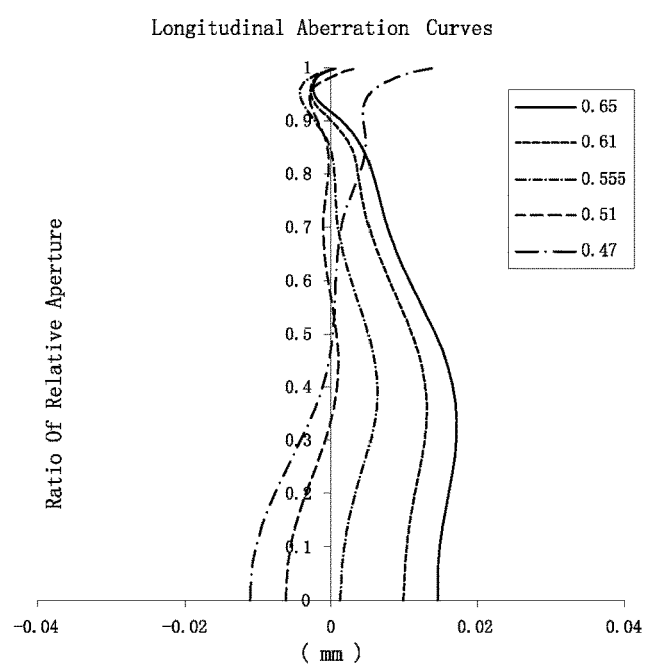
FIG. 6 illustrates longitudinal aberration curves of the image pickup optical lens system according to the first example of the preferred embodiment of the present invention.
Figure 7:
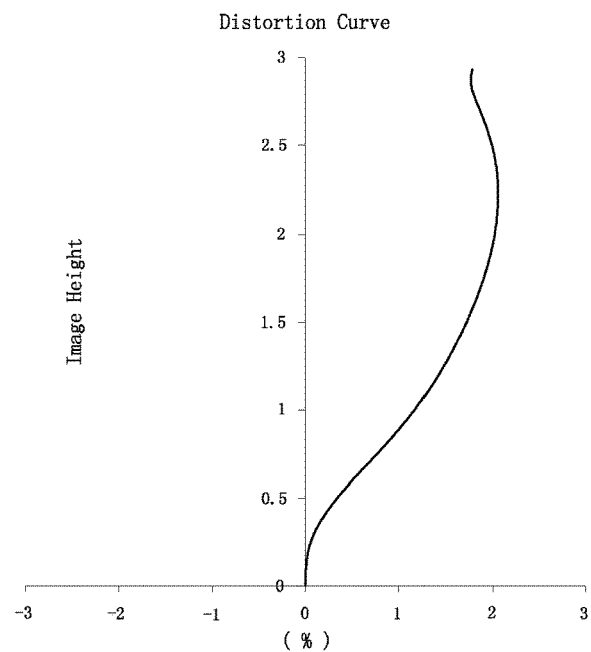
FIG. 7 illustrates a distortion curve of the image pickup optical lens system according to the first example of the preferred embodiment of the present invention.
Figure 8:
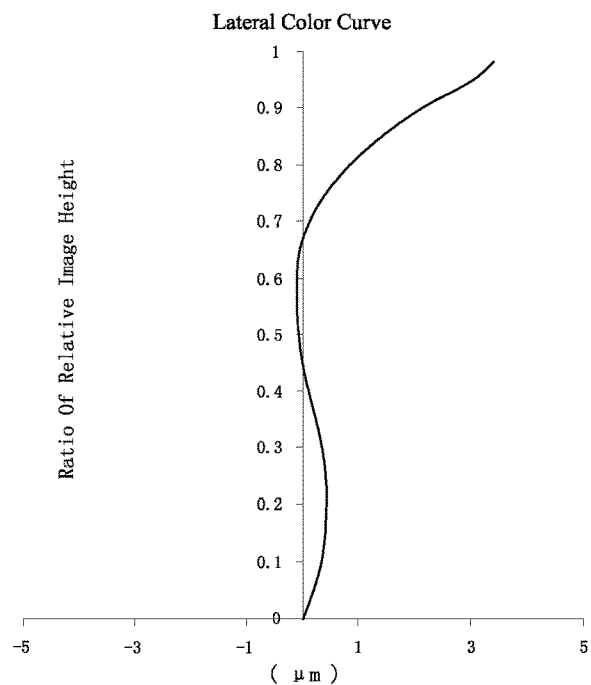
FIG. 8 illustrates a lateral color curve of the image pickup optical lens system according to the first example of the preferred embodiment of the present invention.
Figure 9:
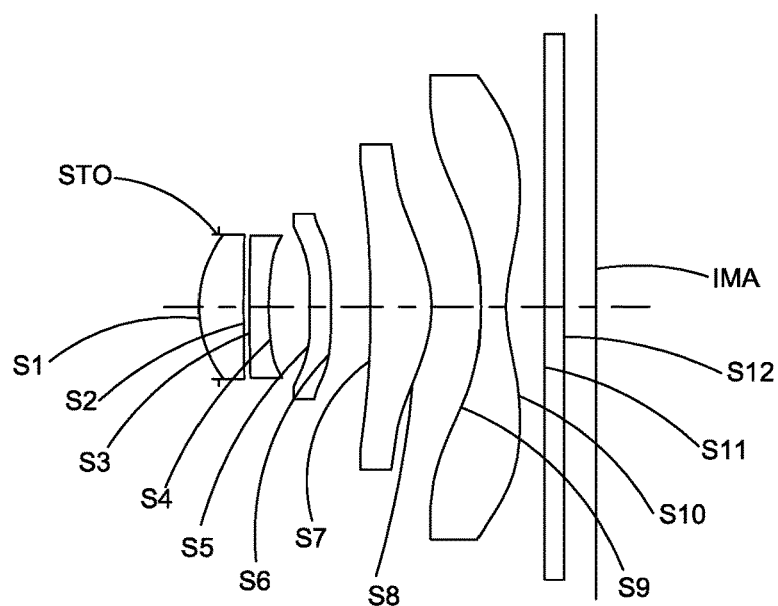
FIG. 9 is a schematic view illustrating the optical structure of the image pickup optical lens system according to a second example of the preferred embodiment of the present invention.
Figure 10:
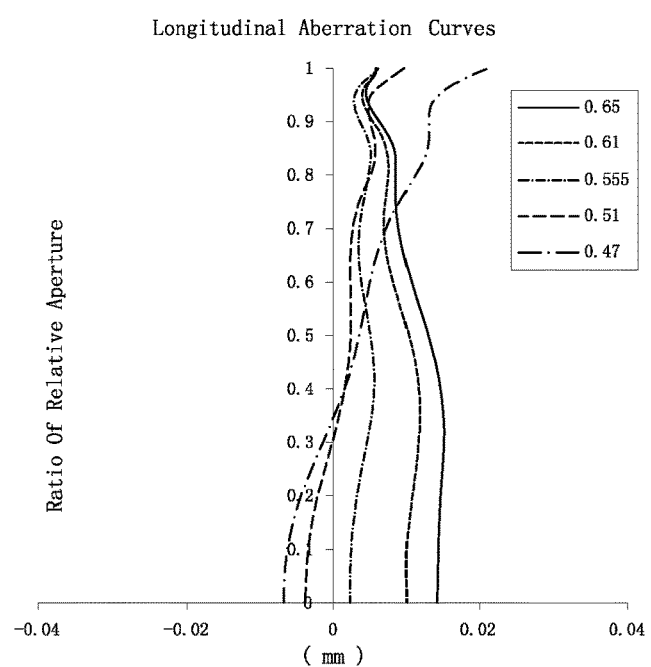
FIG. 10 illustrates longitudinal aberration curves of the image pickup optical lens system according to the second example of the preferred embodiment of the present invention.
Figure 11:
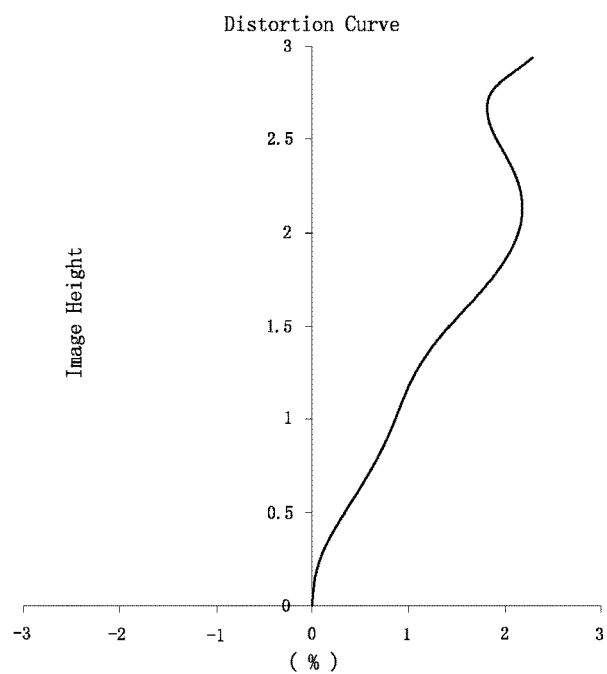
FIG. 11 illustrates a distortion curve of the image pickup optical lens system according to the second example of the preferred embodiment of the present invention.
Figure 12:
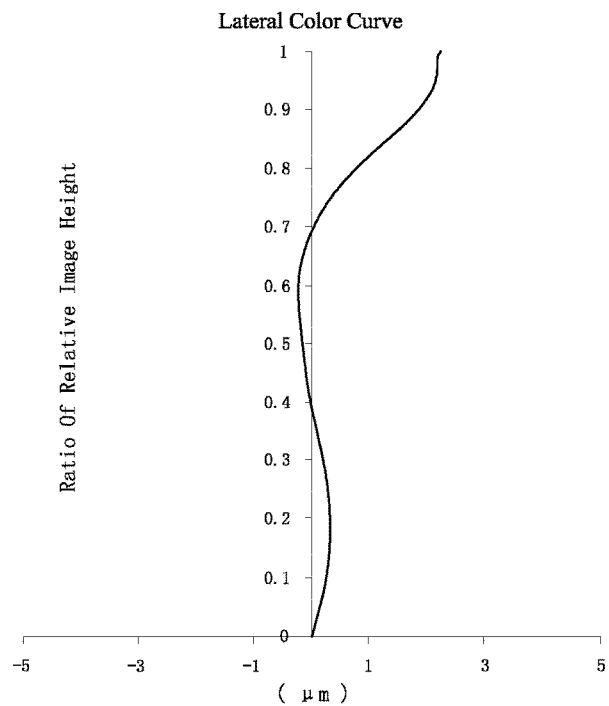
FIG. 12 illustrates a lateral color curve of the image pickup optical lens system according to the second example of the preferred embodiment of the present invention.
Figure 13:
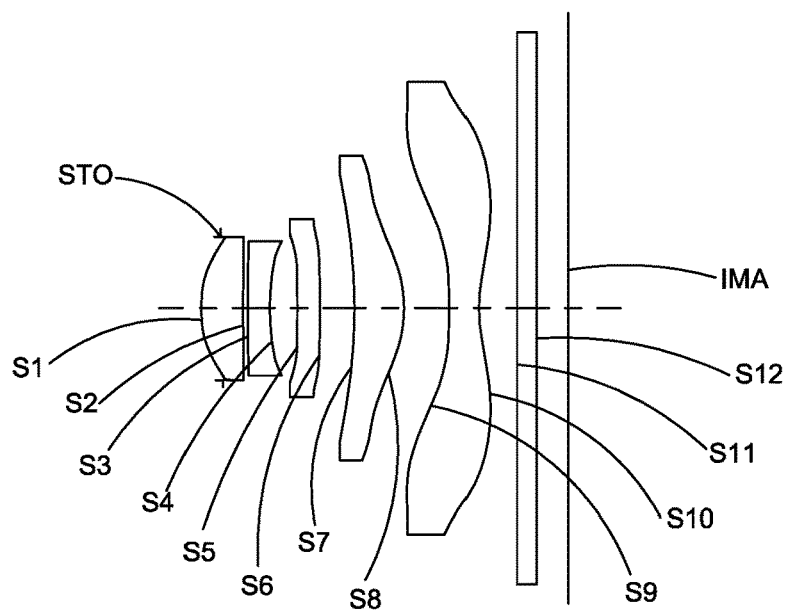
FIG. 13 is a schematic view of the optical structure of the image pickup optical lens system according to a third example of the preferred embodiment of the present invention.
Figure 14:
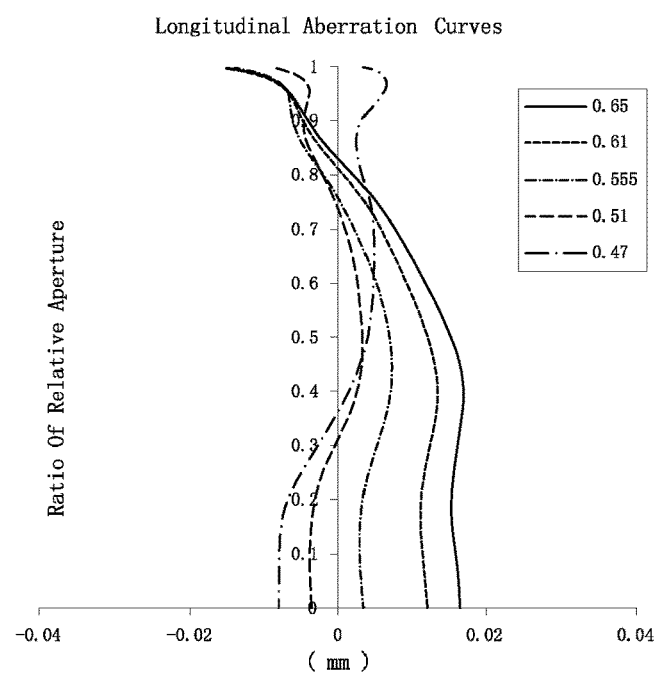
FIG. 14 illustrates longitudinal aberration curves of the image pickup optical lens system according to the third example of the preferred embodiment of the present invention.
Figure 15:
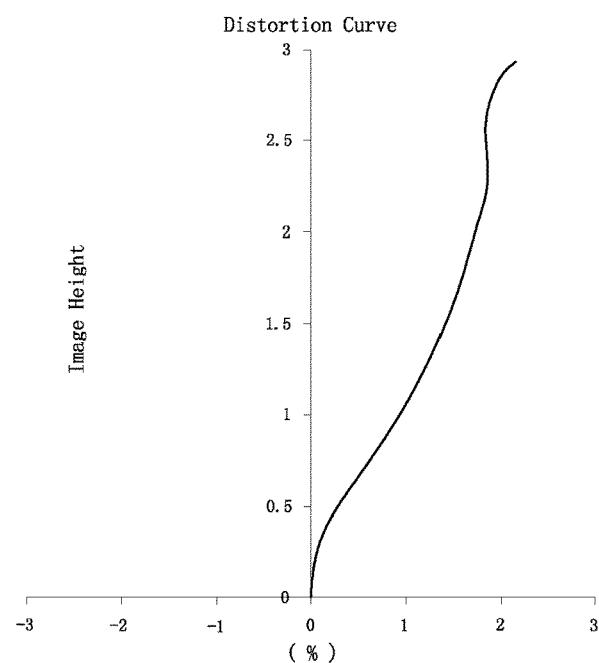
FIG. 15 illustrates a distortion curve of the image pickup optical lens system according to the third example of the preferred embodiment of the present invention.
Figure 16:
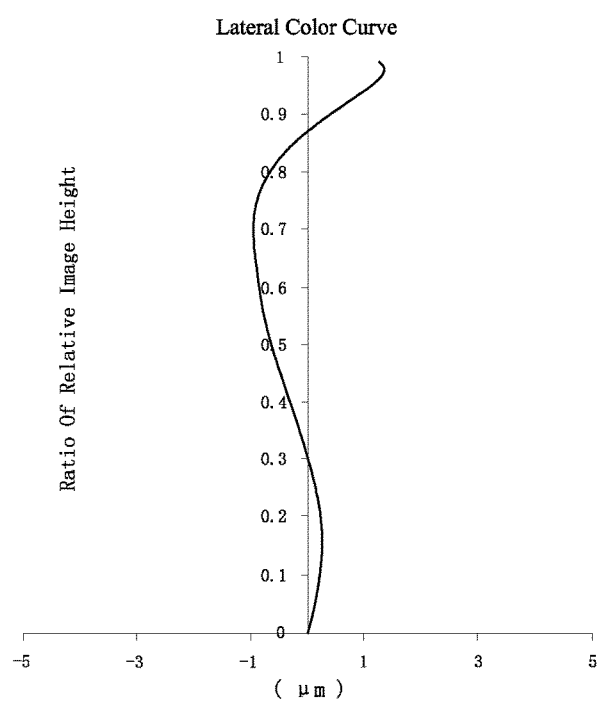
FIG. 16 illustrates a lateral color curve of the image pickup optical lens system according to the third example of the preferred embodiment of the present invention.
Figure 17:
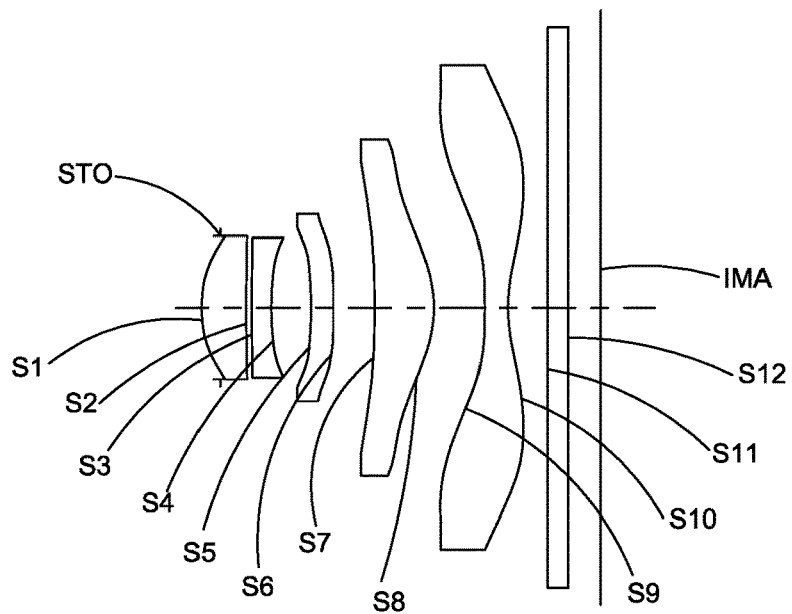
FIG. 17 is a schematic view of the optical structure of the image pickup optical lens system according to a fourth example of the preferred embodiment of the present invention.
Figure 18:
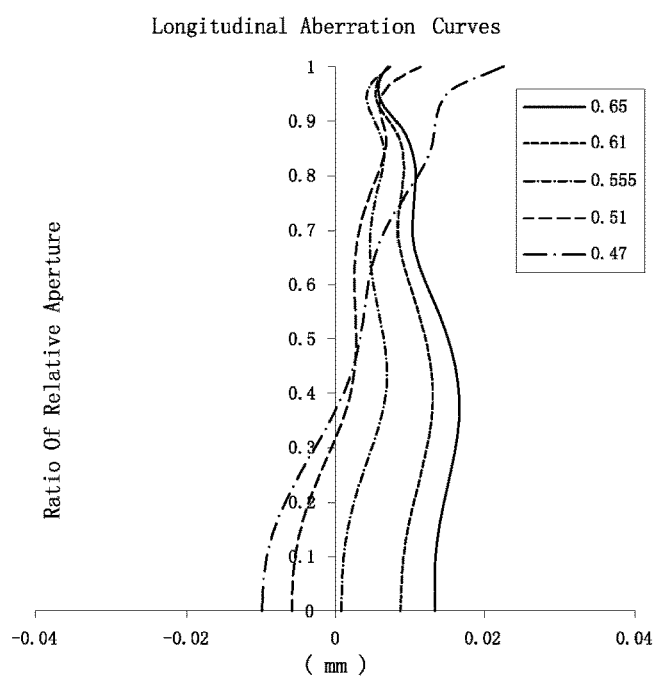
FIG. 18 illustrates longitudinal aberration curves of the image pickup optical lens system according to the fourth example of the preferred embodiment of the present invention.
Figure 19:
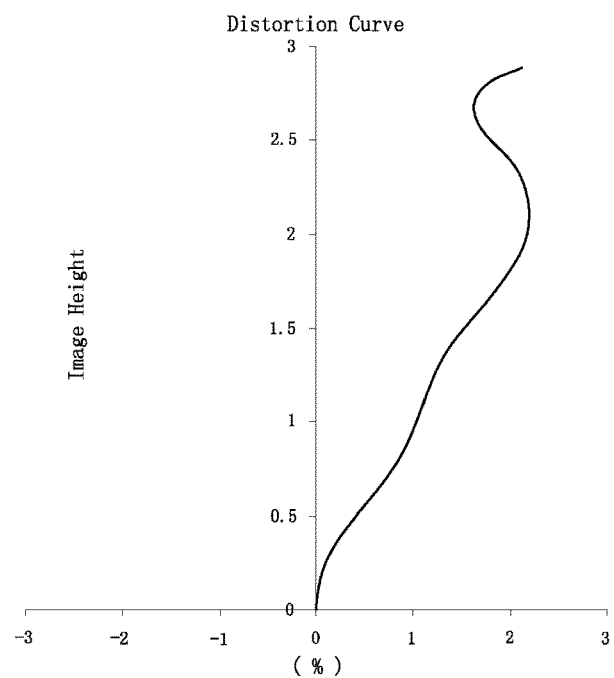
FIG. 19 illustrates a distortion curve of the image pickup optical lens system according to the fourth example of the preferred embodiment of the present invention.
Figure 20:
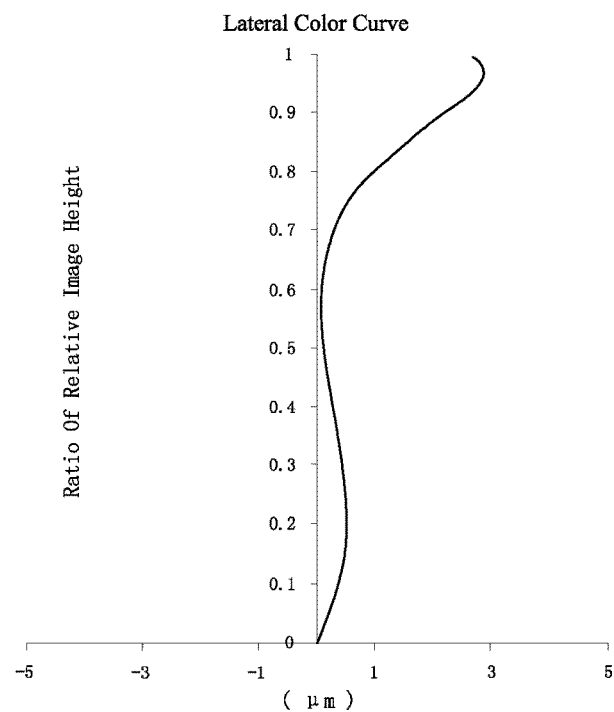
FIG. 20 illustrates a lateral color curve of the image pickup optical lens system according to the fourth example of the preferred embodiment of the present invention.
Figure 21:
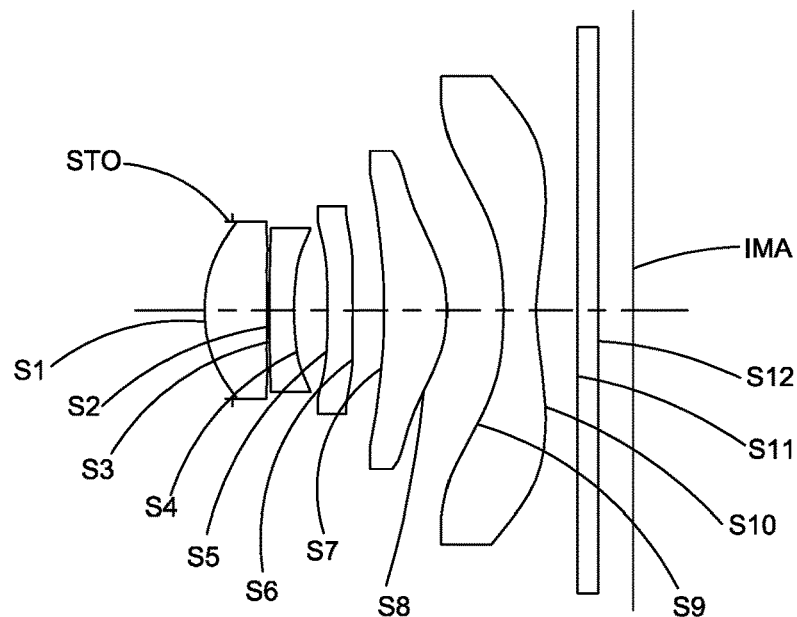
FIG. 21 is a schematic view of the optical structure of the image pickup optical lens system according to a fifth example of the preferred embodiment of the present invention.
Figure 22:
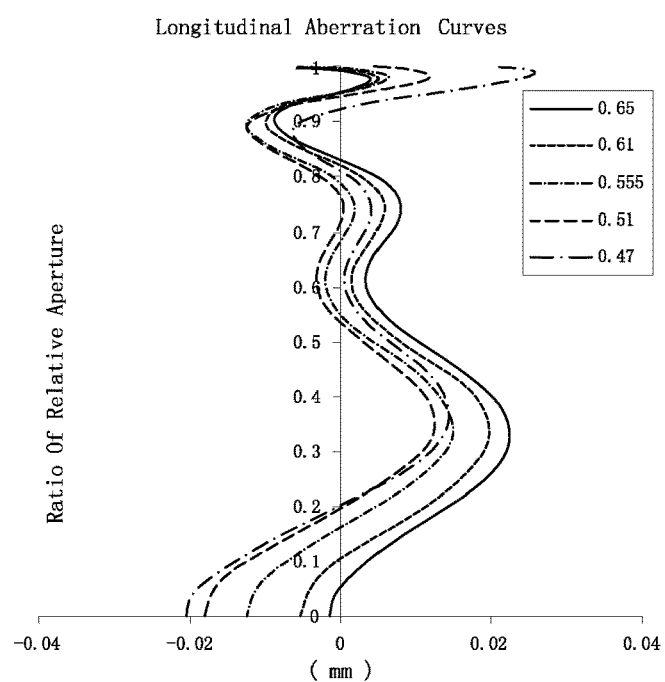
FIG. 22 illustrates longitudinal aberration curves of the image pickup optical lens system according to the fifth example of the preferred embodiment of the present invention.
Figure 23:
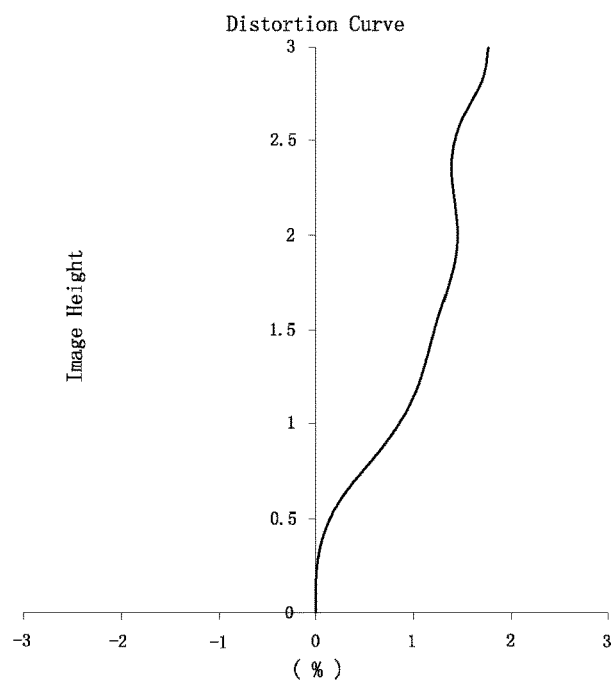
FIG. 23 illustrates a distortion curve of the image pickup optical lens system according to the fifth example of the preferred embodiment of the present invention.
Figure 24:
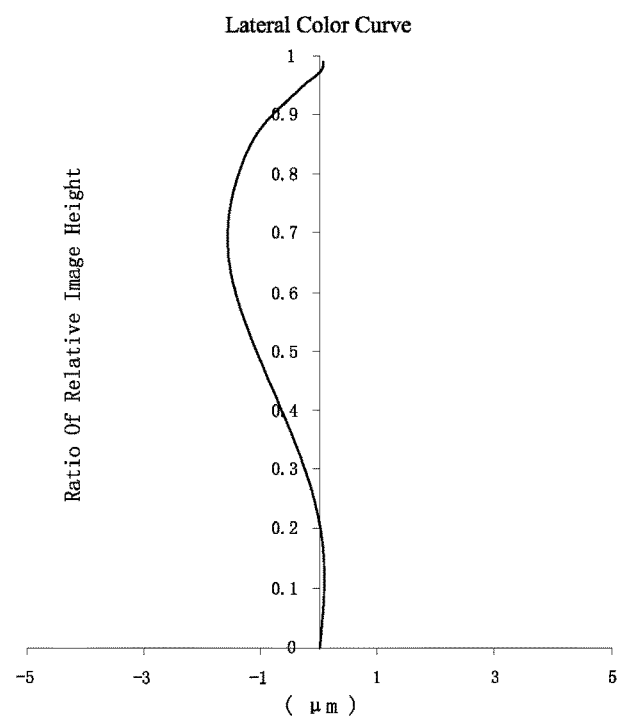
FIG. 24 illustrates a lateral color curve of the image pickup optical lens system according to the fifth example of the preferred embodiment of the present invention.
Figure 25:
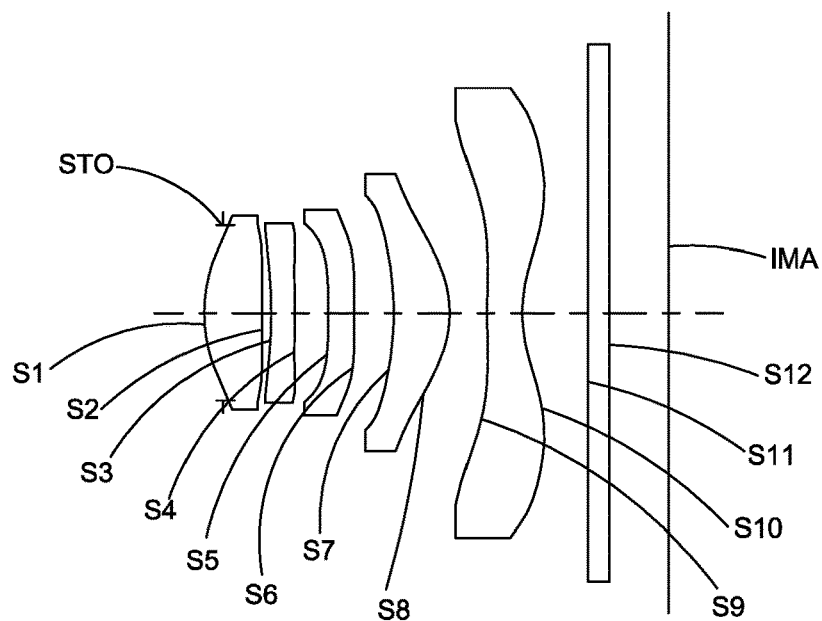
FIG. 25 is a schematic view of the optical structure of the image pickup optical lens system according to a sixth example of the preferred embodiment of the present invention.
Figure 26:
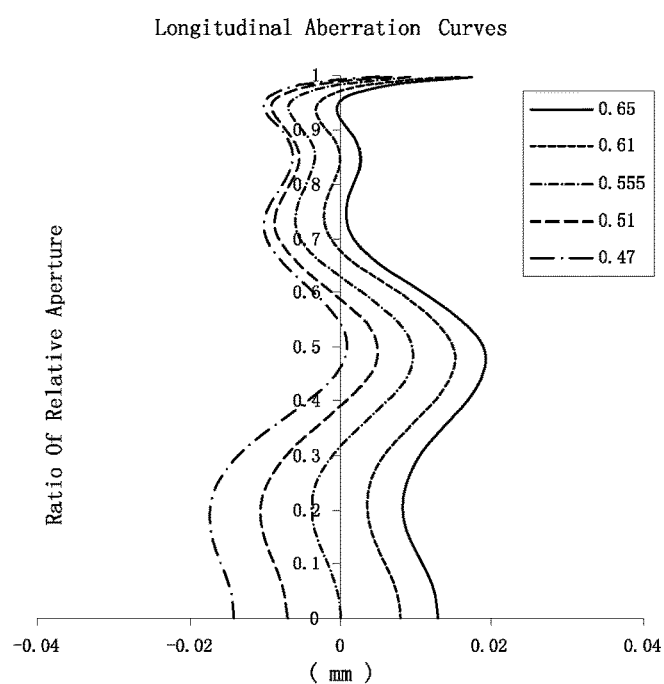
FIG. 26 illustrates longitudinal aberration curves of the image pickup optical lens system according to the sixth example of the preferred embodiment of the present invention.
Figure 27:
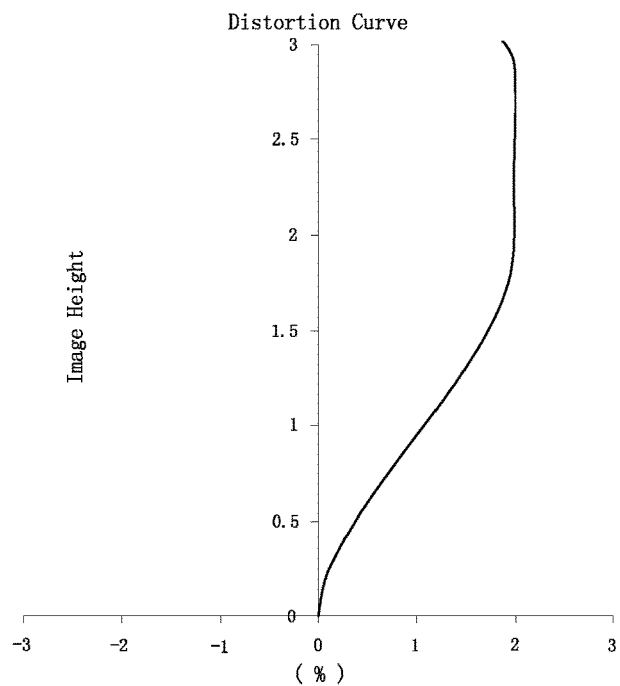
FIG. 27 illustrates a distortion curve of the image pickup optical lens system according to the sixth example of the preferred embodiment of the present invention.
Figure 28:
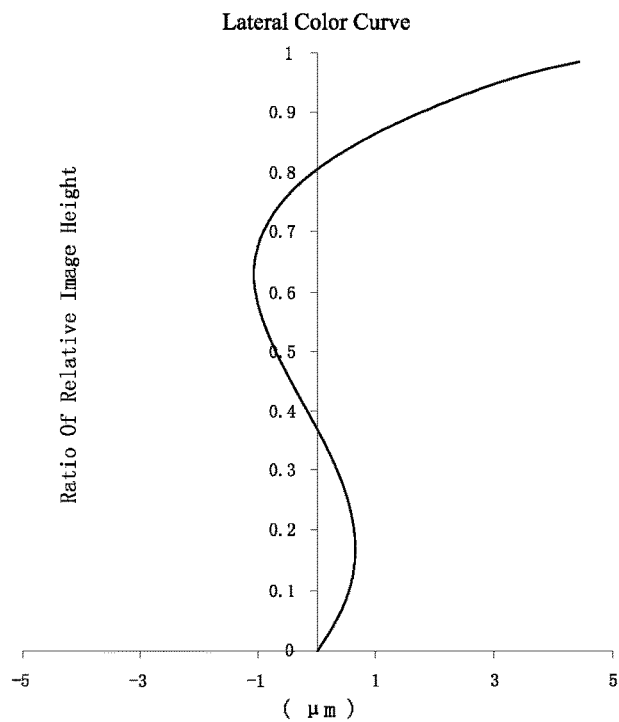
FIG. 28 illustrates a lateral color curve of the image pickup optical lens system according to the sixth example of the preferred embodiment of the present invention.
Figure 29:
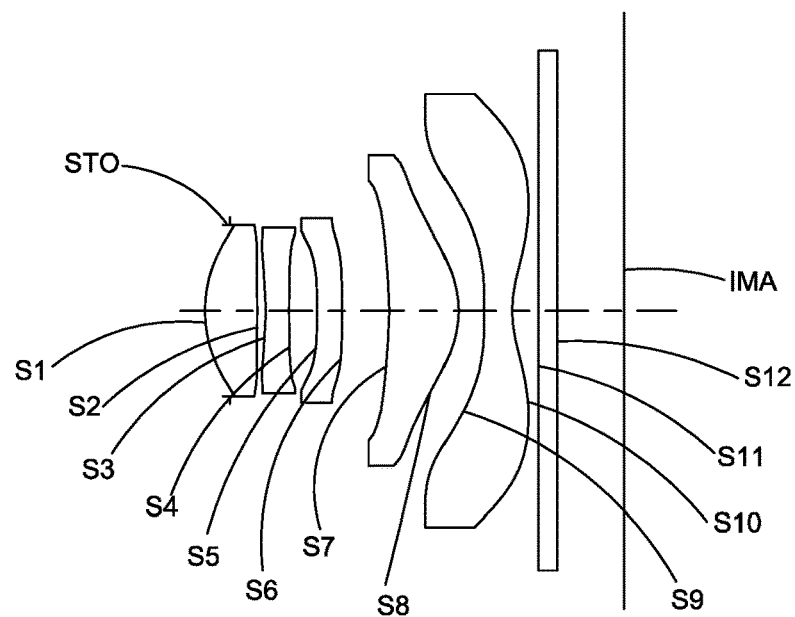
FIG. 29 is a schematic view of the optical structure of the image pickup optical lens system according to a seventh example of the preferred embodiment of the present invention.
Figure 30:
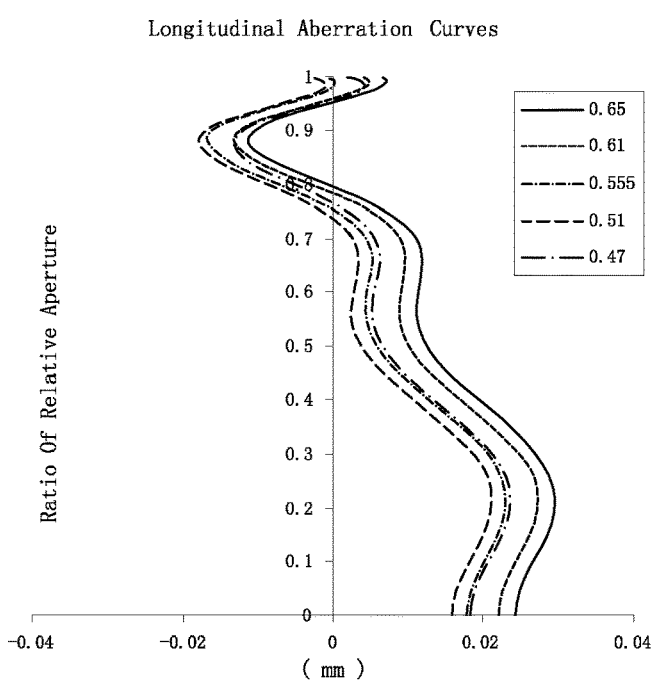
FIG. 30 illustrates longitudinal aberration curves of the image pickup optical lens system according to the seventh example of the preferred embodiment of the present invention.
Figure 31:
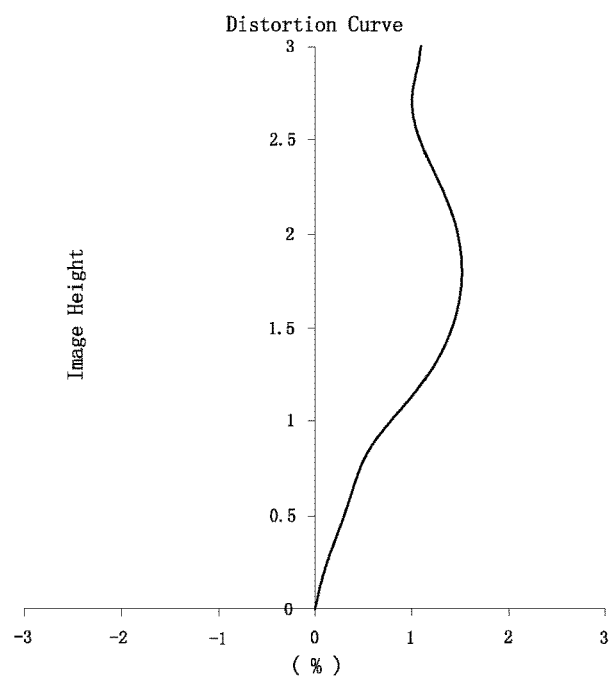
FIG. 31 illustrates a distortion curve of the image pickup optical lens system according to the seventh example of the preferred embodiment of the present invention.
Figure 32:
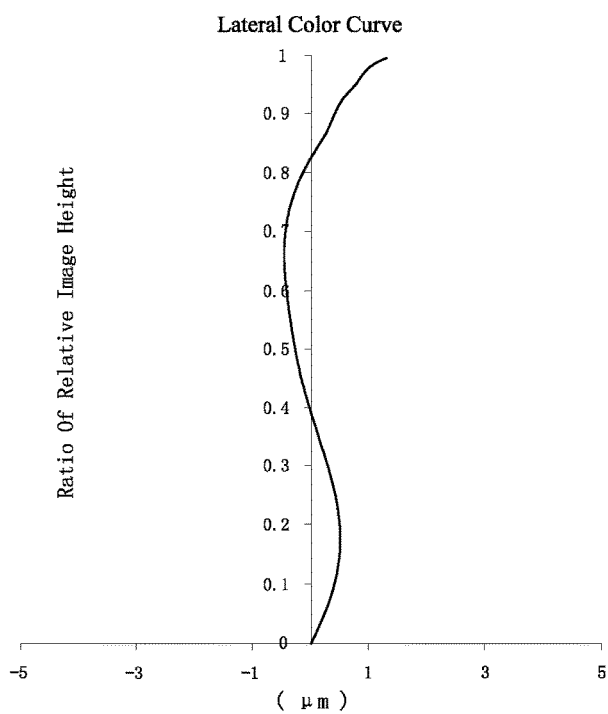
FIG. 32 illustrates a lateral color curve of the image pickup optical lens system according to the seventh example of the preferred embodiment of the present invention.
Figure 33:
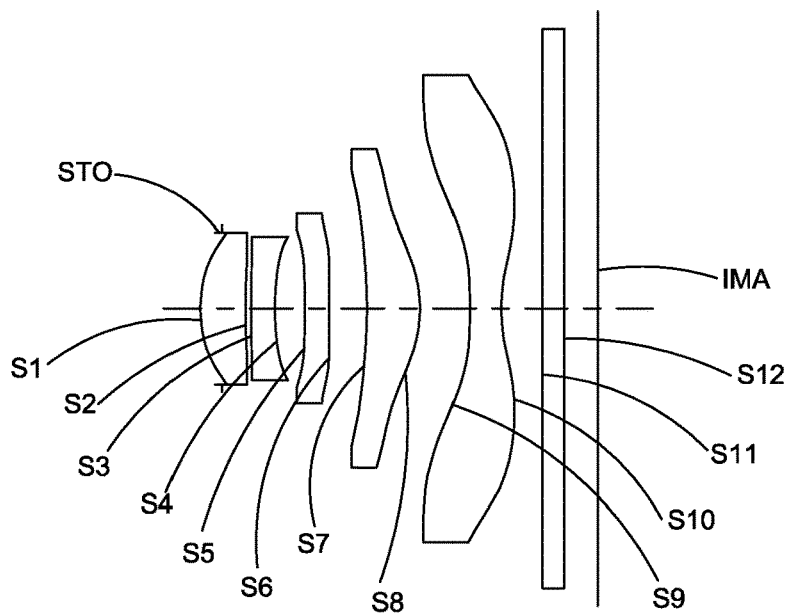
FIG. 33 is a schematic view of the optical structure of the image pickup optical lens system according to an eighth example of the preferred embodiment of the present invention.
Figure 34:
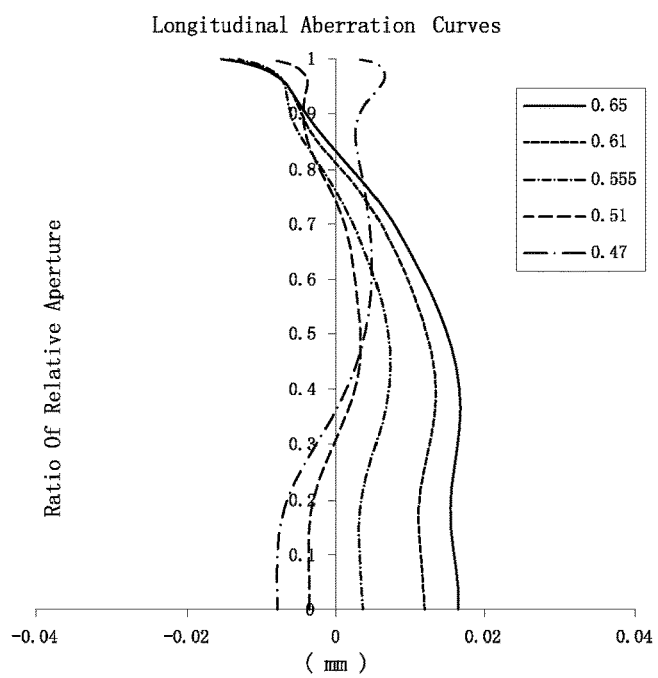
FIG. 34 illustrates longitudinal aberration curves of the image pickup optical lens system according to the eighth example of the preferred embodiment of the present invention.
Figure 35:
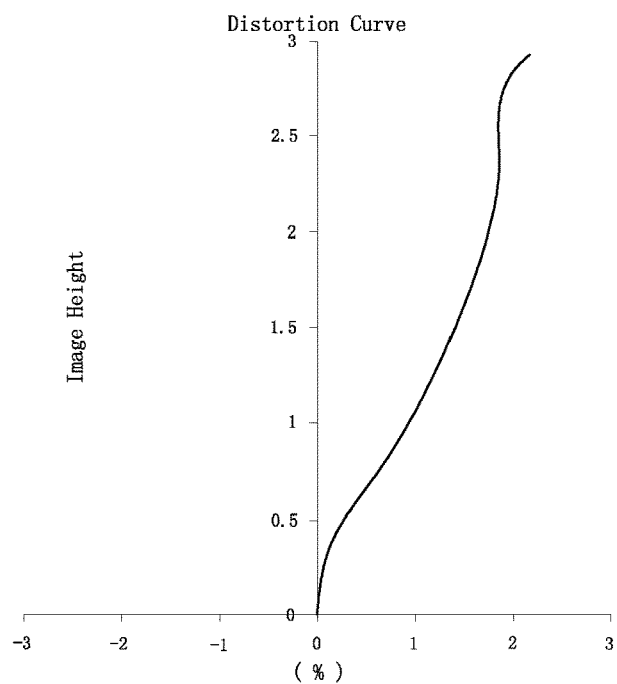
FIG. 35 illustrates a distortion curve of the image pickup optical lens system according to the eighth example of the preferred embodiment of the present invention.
Figure 36:
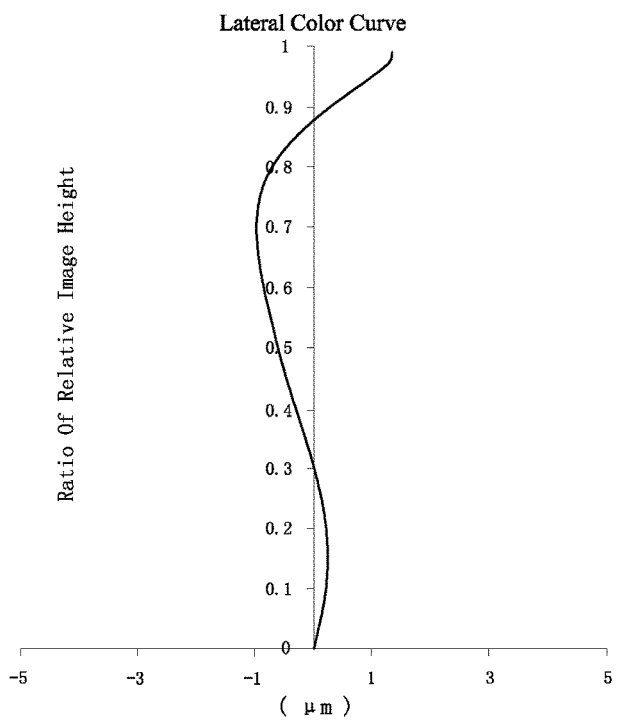
FIG. 36 illustrates a lateral color curve of the image pickup optical lens system according to the eighth example of the preferred embodiment of the present invention.
Figure 37:
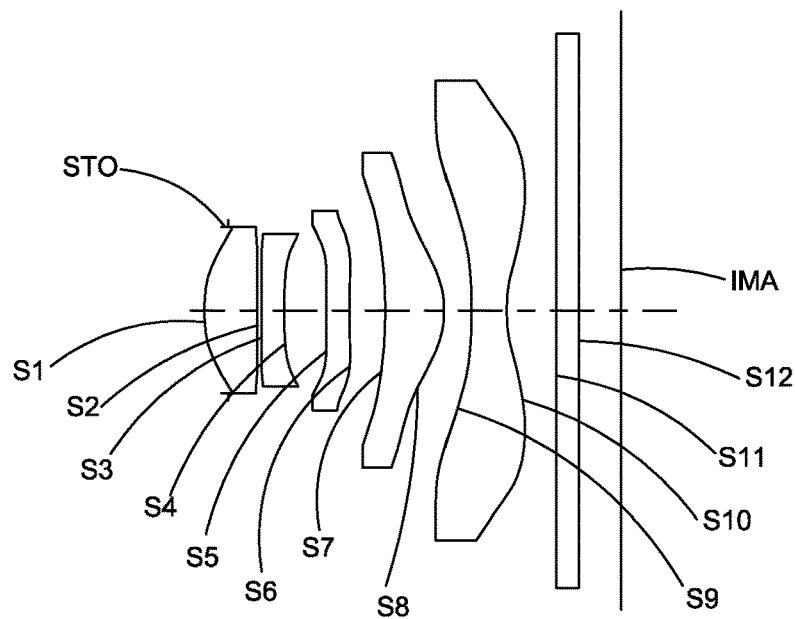
FIG. 37 is a schematic view of the optical structure of the image pickup optical lens system according to a ninth example of the preferred embodiment of the present invention.
Figure 38:
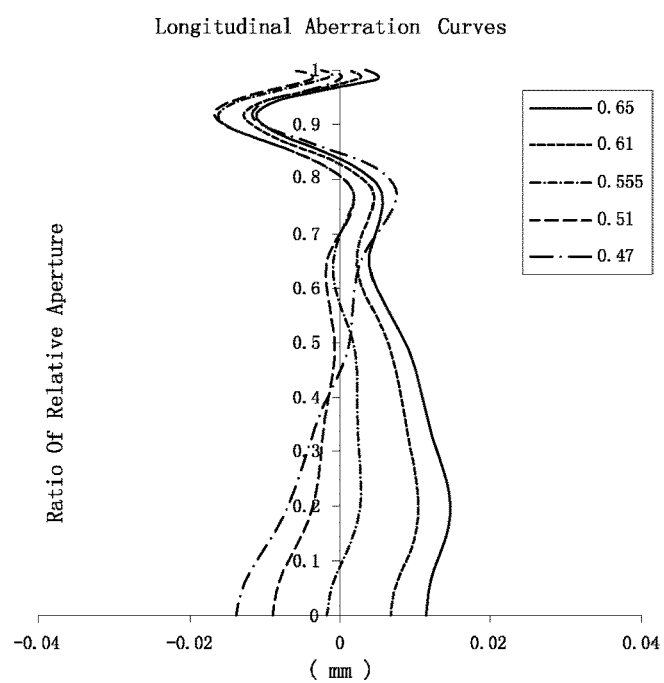
FIG. 38 illustrates longitudinal aberration curves of the image pickup optical lens system according to the ninth example of the preferred embodiment of the present invention.
Figure 39:
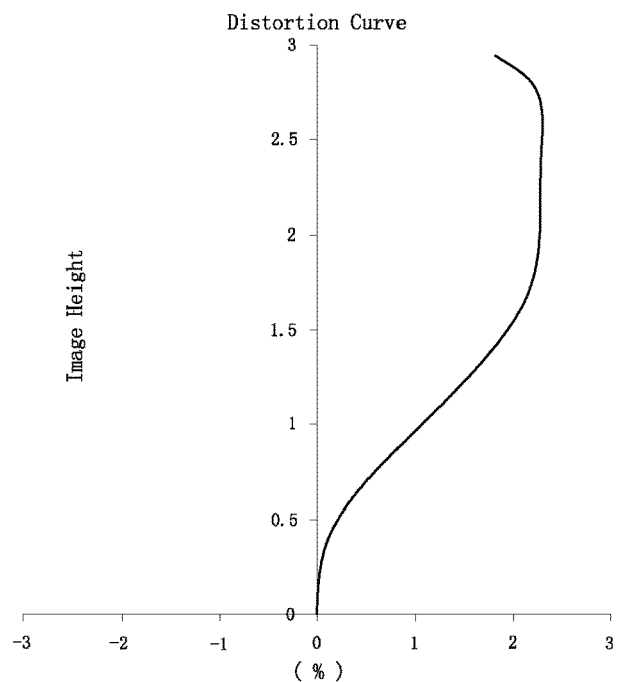
FIG. 39 illustrates a distortion curve of the image pickup optical lens system according to the ninth example of the preferred embodiment of the present invention.
Figure 40:
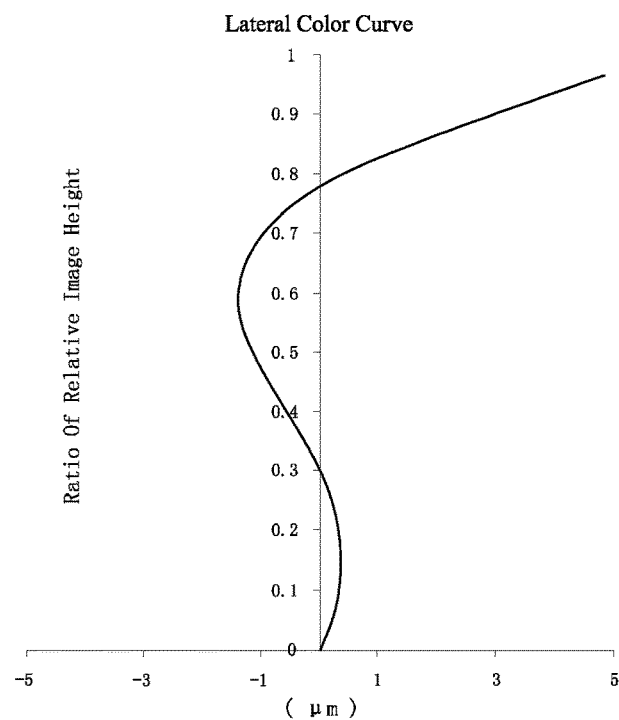
FIG. 40 illustrates a lateral color curve of the image pickup optical lens system according to the ninth example of the preferred embodiment of the present invention.
Figure 41:
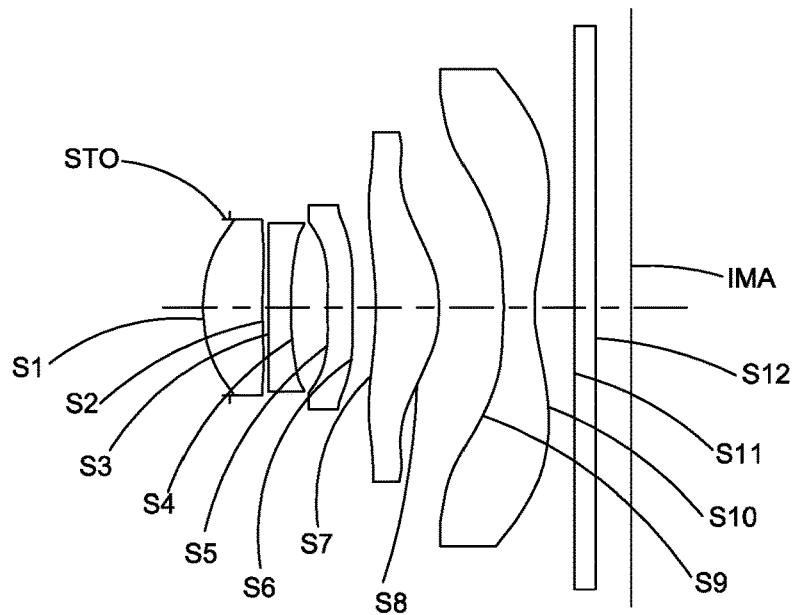
FIG. 41 is a schematic view of the optical structure of the image pickup optical lens system according to a tenth example of the preferred embodiment of the present invention.
Figure 42:
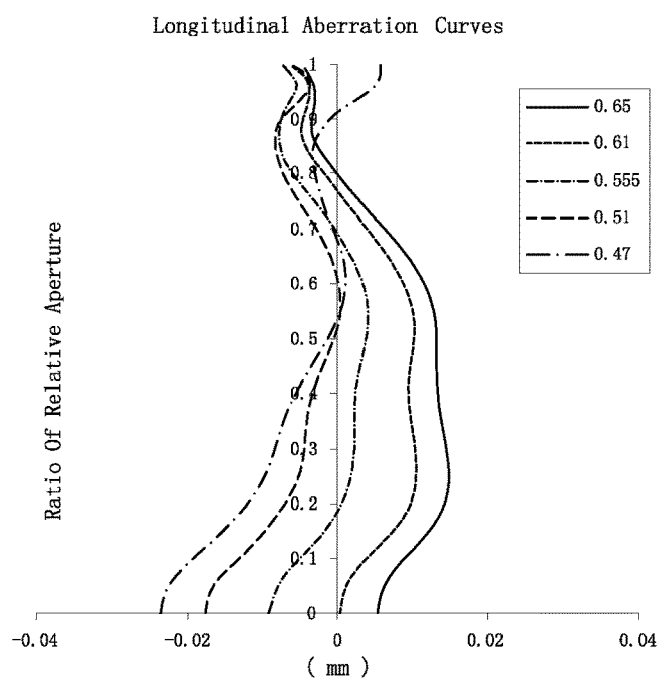
FIG. 42 illustrates longitudinal aberration curves of the image pickup optical lens system according to the tenth example of the preferred embodiment of the present invention.
Figure 43:
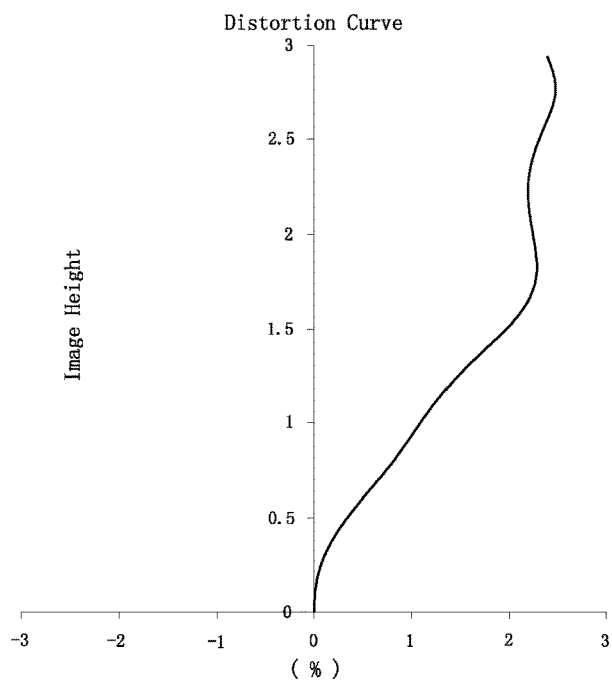
FIG. 43 illustrates a distortion curve of the image pickup optical lens system according to the tenth example of the preferred embodiment of the present invention.
Figure 44:
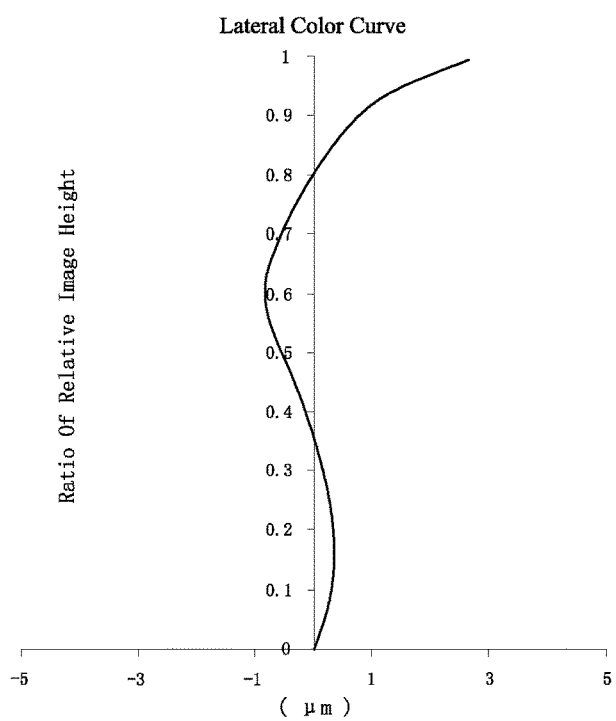
FIG. 44 illustrates a lateral color curve of the image pickup optical lens system according to the tenth example of the preferred embodiment of the present invention

FIGS. 5-65 illustrate ten examples of the optical lens system of the present invention. In the drawings, STO denotes the aperture stop 70, S1 denotes a surface of the object side 11 of the first lens 10, S2 denotes a surface of the image side 12 of the first lens 10, S3 denotes a surface of an object side 21 of the second lens 20, S4 denotes a surface of an image side 22 of the second lens 20, S5 denotes a surface of an object side 31 of the third lens 30, S6 denotes a surface of an image side 32 of the third lens 30, S7 denotes a surface of an object side 41 of the fourth lens 40, S8 denotes a surface of an image side 42 of the fourth lens 40, S9 denotes a surface of the object side 51 of the fifth lens 50, S10 denotes a surface of the image side 52 of the fifth lens 50, S11 denotes a surface of an object side of the flat element 60, S12 denotes a surface of an image side of the flat element 60, IMA denotes the image plane 91 of the image pickup element 90.

Referring to FIGS. 5-8 and 45-46 of the drawings, more specifically, the optical lens system according to a first example of the preferred embodiment of the present invention satisfies the following specific conditional expressions:

$TTL/ImgH=1.44$ $\Sigma AT/Td=0.38$ $f/f12=0.83$ $|f5/R9|=0.43$ $R10/R9=-0.32$ $f1/f4=0.96$ $CT3/CT4=0.41$ $ET4/CT4=0.36$ $ET3min/ET3max=0.86$ $ET5/ET5max=0.58$ $FLmin/TTL=0.20$ $f/f3=-0.13$ $f/f1-|f/f2|=0.65$ $T12/(T23+T34+T45)=0.02.$ Referring to FIGS. 9-12 and 47-48 of the drawings, the optical lens system according to a second example of the preferred embodiment of the present invention is illustrated. In this specific example, the optical lens system satisfies the following specific conditional expressions:

$TTL/ImgH=1.50$ $\Sigma AT/Td=0.38$ $f/f12=0.88$ $|f5/R9|=0.32$ $R10/R9=0.15$ $f1/f4=1.26$ $CT3/CT4=0.45$ $ET4/CT4=0.53$ $ET3min/ET3max=0.65$ $ET5/ET5max=0.64$ $FLmin/TTL=0.27$ $f/f3=-0.24$ $f/f1-|f/f2|=0.80$ $T12/(T23+T34+T45)=0.09.$ Referring to FIGS. 13-16 and 49-50 of the drawings, the optical lens system according to a third example of the preferred embodiment of the present invention is illustrated. In this specific example, the optical lens system satisfies the following specific conditional expressions:

$TTL/ImgH=1.46$ $\Sigma AT/Td=0.35$ $f/f12=0.91$ $|f5/R9|=0.38$ $R10/R9=-0.27$ $f1/f4=1.28$ $CT3/CT4=0.37$ $ET4/CT4=0.36$ $ET3min/ET3max=0.78$ $ET5/ET5max=0.56$ $FLmin/TTL=0.23$ $f/f3=-0.18$ $|f/f1-|f/f2||=0.78$ $T12/(T23+T34+T45)=0.08.$ Referring to FIGS. 17-20 and 51-52 of the drawings, the optical lens system according to a fourth example of the preferred embodiment of the present invention is illustrated. In this specific example, the optical lens system satisfies the following specific conditional expressions:

$TTL/ImgH=1.35$ $\Sigma AT/Td=0.41$ $f/f12=0.82$ $|f5/R9|=0.39$ $R10/R9=-0.27$ $f1/f4=0.98$ $CT3/CT4=0.45$ $ET4/CT4=0.45$ $ET3min/ET3max=0.87$ $ET5/ET5max=0.51$ $FLmin/TTL=0.21$ $f/f3=-0.05$ $|f/f1-|f/f2||=0.68$ $T12/(T23+T34+T45)=0.05.$ Referring to FIGS. 21-24 and 53-54 of the drawings, the optical lens system according to a fifth example of the preferred embodiment of the present invention is illustrated. In this specific example, the optical lens system satisfies the following specific conditional expressions:

$TTL/ImgH=1.39$ $\Sigma AT/Td=0.36$ $f/f12=0.83$ $|f5/R9|=0.29$ $R10/R9=-0.19$ $f1/f4=1.41$ $CT3/CT4=0.40$ $ET4/CT4=0.49$ $ET3min/ET3max=0.81$ $ET5/ET5max=0.50$ $FLmin/TTL=0.23$ $f/f3=-0.13$ $|f/f1-|f/f2||=0.71$ $T12/(T23+T34+T45)=0.04.$ Referring to FIGS. 25-28 and 55-56 of the drawings, the optical lens system according to a sixth example of the preferred embodiment of the present invention is illustrated. In this specific example, the optical lens system satisfies the following specific conditional expressions:

$TTL/ImgH=1.43$ $\Sigma AT/Td=0.39$ $f/f12=0.82$ $|f5/R9|=0.27$ $R10/R9=-0.17$ $f1/f4=1.09$ $CT3/CT4=0.38$ $ET4/CT4=0.41$ $ET3min/ET3max=0.73$ $ET5/ET5max=0.62$ $FLmin/TTL=0.19$ $f/f3=-0.18$ $|f/f1-|f/f2||=0.72$ $T12/(T23+T34+T45)=0.05.$ Referring to FIGS. 29-32 and 57-58 of the drawings, the optical lens system according to a seventh example of the preferred embodiment of the present invention is illustrated. In this specific example, the optical lens system satisfies the following specific conditional expressions:

$TTL/ImgH=1.36$ $\Sigma AT/Td=0.45$ $f/f12=0.82$ $|f5/R9|=0.34$ $R10/R9=-0.23$ $f1/f4=1.02$ $CT3/CT4=0.45$ $ET4/CT4=0.41$ $ET3min/ET3max=0.90$ $ET5/ET5max=0.48$ $FLmin/TTL=0.20$ $f/f3=-0.06$ $|f/f1-|f/f2||=0.69$ $T12/(T23+T34+T45)=0.05.$ Referring to FIGS. 33-36 and 59-60 of the drawings, the optical lens system according to an eighth example of the preferred embodiment of the present invention is illustrated. In this specific example, the optical lens system satisfies the following specific conditional expressions:

$TTL/ImgH=1.43$ $\Sigma AT/Td=0.44$ $f/f12=0.84$ $|f5/R9|=0.43$ $R10/R9=-0.31$ $f1/f4=1.03$ $CT3/CT4=0.35$ $ET4/CT4=0.50$ $ET3\min/ET3\max=0.86$ $ET5/ET5\max=0.59$ $FL\min/TTL=0.19$ $f/f3=-0.12$ $f/f1-|f/f2|=0.71$ $T12/(T23+T34+T45)=0.05.$ Referring to FIGS. 37-40 and 61-62 of the drawings, the optical lens system according to a ninth example of the preferred embodiment of the present invention is illustrated. In this specific example, the optical lens system satisfies the following specific conditional expressions:

$TTL/ImgH=1.35$ $\Sigma AT/Td=0.41$ $f/f12=0.82$ $|f5/R9|=0.39$ $R10/R9=-0.27$ $f1/f4=0.98$ $CT3/CT4=0.45$ $ET4/CT4=0.45$ $ET3\min/ET3\max=0.87$ $ET5/ET5\max=0.51$ $FL\min/TTL=0.21$ $f/f3=-0.05$ $f/f1-|f/f2|=0.68$ $T12/(T23+T34+T45)=0.05.$ Referring to FIGS. 41-44 and 63-64 of the drawings, the optical lens system according to a tenth example of the preferred embodiment of the present invention is illustrated. In this specific example, the optical lens system satisfies the following specific conditional expressions:

$TTL/ImgH=1.41$ $\Sigma AT/Td=0.45$ $f/f12=0.81$ $|f5/R9|=0.34$ $R10/R9=-0.23$ $f1/f4=1.06$ $CT3/CT4=0.37$ $ET4/CT4=0.46$ $ET3\min/ET3\max=0.90$ $ET5/ET5\max=0.58$ $FL\min/TTL=0.20$ $f/f3=-0.07$ $f/f1-|f/f2|=0.68$ $T12/(T23+T34+T45)=0.05.$ One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An optical lens system for forming a subject image on a photoelectric conversion section of a solid image pickup element and an image pickup lens comprising, in order from an object side to an image side, a first lens, a second lens, a third lens, a fourth lens, and a fifth lens,
    the first lens having a positive focal power with a convex surface on an object side thereof and a concave surface on an image side thereof,
    the second lens having a negative focal power,
    the third lens having a negative focal power,
    the fourth lens having a positive focal power with a concave surface on an object side thereof and a convex surface on an image side thereof,
    the fifth lens having a negative focal power with a concave surface on an image side thereof,
    wherein the optical lens system satisfies the following conditional expressions:

$TTL/ImgH \leq 1.50$ $0.8 < f/f12 < 0.92$ $0.25 < |f5/R9| < 0.60$ $0.34 < CT3/CT4 < 0.46$ where,
    TTL denotes an axial distance between the object side of the first lens and an image plane,
    ImgH denotes a half of a diagonal length of an effective pixel area of the image plane,
    f denotes a focal length of the optical lens system,
    f12 denotes a focal length of a combination lens group of the first lens and the second lens,
    f5 denotes a focal length of the fifth lens,
    R9 denotes a radius of a curvature of an object side of the fifth lens, CT3 denotes a central thickness of the third lens, and
CT4 denotes a central thickness of the fourth lens.

2. The optical lens system, as recited in claim 1, wherein the optical lens system further satisfies the following specific conditional expressions:

$$0.35 \leq \Sigma AT/Td < 0.50$$

$$|R10/R9| < 0.32$$

$$0.95 < f1/f4 < 1.45$$

where,
ΣAT denotes a sum of axial distances between each two adjacent lenses of the five lenses,
Td denotes an axial distance between the object side of the first lens and the image side of the fifth lens,
R10 denotes a radius of a curvature of the image side of the fifth lens, and
f4 denotes a focal length of the fourth lens.

3. The optical lens system, as recited in claim 1, wherein the optical lens system further satisfies the following specific conditional expressions:

$$0.35 < ET4/CT4 < 0.55$$

$$0.65 \leq ET3\min/ET3\max < 0.95$$

$$0.45 < ET5/ET5\max < 0.65$$

$$0.15 < FL\min/TTL < 0.3$$

$$|f/f3| < 0.25$$

$$0.6 < f/f1 - |f/f2| < 0.85$$

$$T12/(T23+T34+T45) < 0.1$$

where,
f2 denotes a focal length of the second lens,
f3 denotes a focal length of the third lens,
ET4 denotes an edge thickness at the utmost effective radius of the fourth lens,
ET3min denotes a minimum horizontal thickness between a center and a peripheral edge of the third lens,
ET3max denotes a maximum horizontal thickness between a center and a peripheral edge of the third lens,
ET5 denotes an edge thickness at the utmost effective radius of the fifth lens,
ET5max denotes a maximum horizontal thickness between a center and a peripheral edge of the fifth lens,
FLmin denotes a horizontal distance between a critical point of the image side of the fifth lens and the image plane,
T12 denotes an axial distance between the first lens and the second lens,
T23 denotes an axial distance between the second lens and the third lens,
T34 denotes an axial distance between the third lens and the fourth lens, and
T45 denotes an axial distance between the fourth lens and the fifth lens.

4. The optical lens system, as recited in claim 2, wherein the optical lens system further satisfies the following specific conditional expressions:

$$0.35 < ET4/CT4 < 0.55$$

$$0.65 \leq ET3\min/ET3\max < 0.95$$

$$0.45 < ET5/ET5\max < 0.65$$

$$0.15 < FL\min/TTL < 0.3$$

$$|f/f3| < 0.25$$

$$0.6 < f/f1 - |f/f2| < 0.85$$

$$T12/(T23+T34+T45) < 0.1$$

where,
f2 denotes a focal length of the second lens,
f3 denotes a focal length of the third lens,
ET4 denotes an edge thickness at the utmost effective radius of the fourth lens,
ET3min denotes a minimum horizontal thickness between a center and a peripheral edge of the third lens,
ET3max denotes a maximum horizontal thickness between a center and a peripheral edge of the third lens,
ET5 denotes an edge thickness at the utmost effective radius of the fifth lens,
ET5max denotes a maximum horizontal thickness between a center and a peripheral edge of the fifth lens,
FLmin denotes a horizontal distance between a critical point of the image side of the fifth lens and the image plane,
T12 denotes an axial distance between the first lens and the second lens,
T23 denotes an axial distance between the second lens and the third lens,
T34 denotes an axial distance between the third lens and the fourth lens, and
T45 denotes an axial distance between the fourth lens and the fifth lens.

5. The optical lens system, as recited in claim 4, wherein the optical lens system further satisfies the following specific conditional expressions:

$$1.35 \leq TTL/ImgH \leq 1.50.$$

6. The optical lens system, as recited in claim 4, wherein the optical lens system further satisfies the following specific conditional expressions:

$$0.35 \leq \Sigma AT/Td \leq 0.45.$$

7. The optical lens system, as recited in claim 4, wherein the optical lens system further satisfies the following specific conditional expressions:

$$0.81 \leq f/f12 \leq 0.91.$$

8. The optical lens system, as recited in claim 4, wherein the optical lens system further satisfies the following specific conditional expressions:

$$0.27 \leq |f5/R9| < 0.43.$$

9. The optical lens system, as recited in claim 4, wherein the optical lens system further satisfies the following specific conditional expressions:

$$-0.32 < R10/R9 < 0.15.$$

10. The optical lens system, as recited in claim 4, wherein the optical lens system further satisfies the following specific conditional expressions:

$$0.96 \leq f1/f4 \leq 1.41.$$

11. The optical lens system, as recited in claim 4, wherein the optical lens system further satisfies the following specific conditional expressions:

$$0.35 \leq CT3/CT4 \leq 0.45.$$

12. The optical lens system, as recited in claim 4, wherein the optical lens system further satisfies the following specific conditional expressions:

$0.36 \leq ET4/CT4 \leq 0.53$.

13. The optical lens system, as recited in claim 4, wherein the optical lens system further satisfies the following specific conditional expressions:

$0.65 \leq ET3\mathrm{min}/ET3\mathrm{max} \leq 0.90$.

14. The optical lens system, as recited in claim 4, wherein the optical lens system further satisfies the following specific conditional expressions:

$0.48 \leq ET5/ET5\mathrm{max} \leq 0.64$.

15. The optical lens system, as recited in claim 4, wherein the optical lens system further satisfies the following specific conditional expressions:

$0.19 \leq FL\mathrm{min}/TTL \leq 0.27$.

16. The optical lens system, as recited in claim 4, wherein the optical lens system further satisfies the following specific conditional expressions:

$-0.24 \leq f/f3 \leq -0.05$.

17. The optical lens system, as recited in claim 4, wherein the optical lens system further satisfies the following specific conditional expressions:

$0.65 \leq f/f1 - |f/f2| \leq 0.80$.

18. The optical lens system, as recited in claim 4, wherein the optical lens system further satisfies the following specific conditional expressions:

$0.02 \leq T12/(T23+T34+T45) \leq 0.09$.

19. The optical lens system, as recited in claim 4, wherein the optical lens system further satisfies the following specific conditional expressions:

$1.35 \leq TTL/ImgH \leq 1.50$ $0.35 \leq \Sigma AT/Td \leq 0.45$ $0.81 \leq f/f12 \leq 0.91$ $0.27 \leq |f5/R9| \leq 0.43$ $-0.32 \leq R10/R9 \leq 0.15$ $0.96 \leq f1/f4 \leq 1.41$ $0.35 \leq CT3/CT4 \leq 0.45$ $0.36 \leq ET4/CT4 \leq 0.53$ $0.65 \leq ET3\mathrm{min}/ET3\mathrm{max} \leq 0.90$ $0.48 < ET5/ET5\mathrm{max} \leq 0.64$ $0.19 \leq FL\mathrm{min}/TTL < 0.27$ $-0.24 \leq f/f3| < 0.05$ $0.65 \leq f/f1 - |f/f2| \leq 0.80$ $0.02 \leq T12/(T23+T34+T45) \leq 0.09$.

* * * * *